US009613758B2

(12) United States Patent
Moilanen et al.

(10) Patent No.: US 9,613,758 B2
(45) Date of Patent: *Apr. 4, 2017

(54) FABRICATION AND APPLICATION OF POLYMER-GRAPHITIC MATERIAL NANOCOMPOSITES AND HYBRIDE MATERIALS

(76) Inventors: Pasi Moilanen, Jyvaskyla (FI); Jorma A. Virtanen, Las Vegas, NV (US)

( * ) Notice: Subject to any disclaimer, the term of this patent is extended or adjusted under 35 U.S.C. 154(b) by 755 days.

This patent is subject to a terminal disclaimer.

(21) Appl. No.: 13/518,781

(22) PCT Filed: Dec. 22, 2010

(86) PCT No.: PCT/FI2010/000077
§ 371 (c)(1),
(2), (4) Date: Jun. 22, 2012

(87) PCT Pub. No.: WO2011/076979
PCT Pub. Date: Jun. 30, 2011

(65) Prior Publication Data
US 2013/0130049 A1 May 23, 2013

(30) Foreign Application Priority Data

Dec. 22, 2009 (FI) ..................... 20090495
Apr. 9, 2010 (FI) ..................... 20100143
Oct. 18, 2010 (FI) ..................... 20106077

(51) Int. Cl.
*H01B 1/04* (2006.01)
*H01B 1/24* (2006.01)
(Continued)

(52) U.S. Cl.
CPC ............... *H01G 9/042* (2013.01); *C08K 3/04* (2013.01); *H01B 1/04* (2013.01); *H01B 1/24* (2013.01);
(Continued)

(58) Field of Classification Search
CPC .. H01B 1/04; H01B 1/24; C01B 31/02; C01B 31/0206; C01B 31/04; C08K 3/04; B82Y 40/00
See application file for complete search history.

(56) References Cited

U.S. PATENT DOCUMENTS

2008/0264482 A1* 10/2008 Lee et al. ................ 136/256
2015/0041730 A1*  2/2015 Kangas et al. ........... 252/511

FOREIGN PATENT DOCUMENTS

EP         1862432     * 12/2007
WO       03/013199 A2    2/2003
(Continued)

OTHER PUBLICATIONS

The International Search Report for PCT/FI2010/000077, issued Apr. 14, 2011.

*Primary Examiner* — Mark Kopec
(74) *Attorney, Agent, or Firm* — Marger Johnson

(57) ABSTRACT

The present invention describes a nanocomposite and hybride material of functionalized carbon nanotubes and cellulose and associated methods for the fabrication of that nanocomposite or hybride material containing electromagnetically active nanoparticles. The fabrication is fast, environmentally friendly, and economical. These nanocomposites are strong and electrically conducting, and have many materials and electronic applications.

13 Claims, 21 Drawing Sheets

Figure 1:
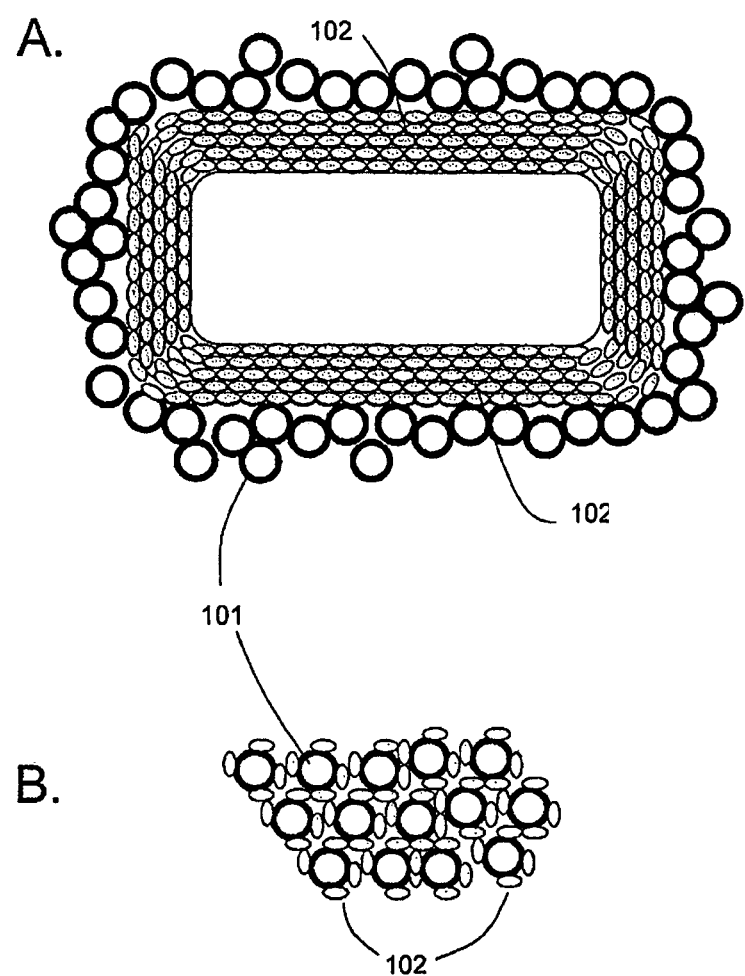

(51) Int. Cl.
    *C08K 3/00*     (2006.01)
    *H01G 9/042*     (2006.01)
    *C08K 3/04*     (2006.01)
    *H01G 9/00*     (2006.01)
    *H01G 11/36*     (2013.01)
    *B82Y 30/00*     (2011.01)
    *B82Y 40/00*     (2011.01)

(52) U.S. Cl.
    CPC .............. *H01G 9/155* (2013.01); *H01G 11/36* (2013.01); *B82Y 30/00* (2013.01); *B82Y 40/00* (2013.01); *Y02E 60/13* (2013.01); *Y10T 428/31971* (2015.04)

(56) References Cited

FOREIGN PATENT DOCUMENTS

| | | | |
|---|---|---|---|
| WO | 2004/106420 | A2 | 12/2004 |
| WO | 2008/034939 | A1 | 3/2008 |
| WO | WO2008034939 | * | 3/2008 |

* cited by examiner

FABRICATION AND APPLICATION OF POLYMER-GRAPHITIC MATERIAL NANOCOMPOSITES AND HYBRIDE MATERIALS

CROSS REFERENCE TO RELATED APPLICATIONS

This application claims priority from Finnish Application Serial No. 20090495, filed Dec. 22, 2009, and Finnish Application Serial No. 20100143, filed Apr. 9, 2010, and Finnish Application Serial No. 20106077, filed Oct. 18, 2010.

BACKGROUND

1. Field of Invention

This invention relates to the fabrication of nanocomposites from two or more materials that have low solubility in a liquid milieu and large scale structures of these materials. More specifically fabrication of nano-composites or hybride materials of polymer and graphitic material using nanoparticles as dispersion facilitators is described. In addition, the present invention involves the electromagnetic utilization graphitic material-polymer nanocomposites for supercapacitors and electromagnetic shielding.

2. Prior Art and Overall Description

Fabrication of nanocomposites of two or more materials is not straightforward. Often these materials do not have a common solvent. Even, when both or all materials have a common solvent, their deposition will most probably result into a random structure, in which both components can be clustered as well as mixed in a nanoscale. The present invention solves this problem using carbon nanotubes and cellulose as examples. Efficient dispersion of graphitic materials, such as carbon nanotubes (CNTs) and graphite into polymers continues to be problematic. Graphitic materials tend to aggregate, especially, if their concentration exceeds 10% in the medium. Aggregation prevents the full utilization of the graphitic material. For example, a capacitance of supercapacitor depends on the available surface area of the graphitic material. Aggregate has much less available surface area than individually separated graphitic particles have combined surface area. Electromagnetic interference (EMI) protection efficiency is hampered by clustering. Material strength is much better served by individually dispersed graphitic particles than by clusters.

This invention provides very efficient dispersion methods and materials that are often accompanied by functionalization of graphitic particles. Currently preferred embodiments are almost exclusively related to the fabrication of CNT-cellulose nanocomposite, i.e., graphitic material consists of CNTs, and polymer is cellulose or modified cellulose. Although scanning electron microscope (SEM), and transmission electron microscope (TEM) images prove good dispersion, more importantly, capacitances of supercapacitors, EMI shielding efficacy, and material strength are practically important implications of the efficacy of the dispersion method. Carbon nanotubes (CNTs) can be single walled (SWNT), double walled (DWNT) or multi walled (MWNT). They can have diameters that range from subnanometer to over 100 nm. Also CNTs have a multitude of chiralities. Thus, there are hundreds of different kind of CNTs. Some CNTs are metallic conductors and some are semiconducting. Many CNTs are better electrical conductors than silver at room temperature. All CNTs are very strong, and the tensile strength of the CNTs is tens of times better than that of steel.

CNTs can be functionalized by several methods. One commonly used method is oxidation with the mixture of sulfuric and nitric acids to form carboxylic groups (R. E. Smalley, et al., Method for forming an array of single-all carbon nanotubes and compositions thereof, US2002/0159943 A1). Many moieties can be attached with carboxylic groups. In another method radicals are generated from diazonium salts, and these radicals react with the CNTs (J. M. Tour, et al., Process for functionalizing carbon nanotubes under solvent-free conditions, Int. Appl. WO 2004/007364). In a co-owned method (J. Virtanen et al. PCT/FI2005/000437) CNTs are cut, and the nascent dangling bonds react with a reagent that is present. These are just some examples that are well known in-the-art. Functionalized CNTs are not really CNTs anymore. They will also be called hybride nanotubes (HNTs) in this context. The term HNT-cellulose material will be used all hybride materials of the present invention CNTs and cellulose are sparingly soluble into all solvents. Due to large particle size they form suspensions rather than solutions, although terms solubility, solution and solubilization will be used here frequently as well as more accurate term dispersion.

CNTs can be solubilized into water using detergents, and into organic solvents as such or using compounds, such as pyrene, that increase the solubility of the CNTs. Detergents may hamper the good properties of CNT-cellulose materials.

Cellulose and its derivatives can be used to disperse CNTs, and cellulose-CNT composites have been used as supercapacitors, and EMI protection, cellulose is: renewable material, and its annual production in the nature might be more than the production of any other natural or man-made polymer. In wood cellulose is intertwined with lignin that is an aromatic polyether. Pure cellulose fibers are few micrometers long, and they have a rectangular cross-section. The cellulose fibers are hollow. Cellulose fibers bind with each other by hydrogen bonds. Because of the large number of hydrogen bonds the interaction is strong. However, water is able to break at least partially the hydrogen bonding network between fibers, and wet paper is very weak.

When nanoparticles or fibers are mixed, composite is formed. If the mixing is efficient, so that the components are mixed also in nanoscale, a nanocomposite will be formed. Fabrication of nanocomposites is not trivial, because often each component tends to separate into clusters that do not contain or contain very little of the other component(s). When the nanocomponents are chemically bound, the material is classified as a hybride material. The main focus of this invention is the fabrication and applications of HNT-cellulose nanocomposites and hybride materials.

It is possible to fabricate cellulose nanofibers that have diameters between 5-100 nm. They are still several micrometers long, and are called microfibrillated cellulose (M. Ankerfors, et al., A manufacturing method for microfibrillated cellulose, 6th International Paper and Coating Chemistry Symposium, 2006).

It is possible to fabricate even smaller bundles of cellulose. Cellulose fragment gel is made of cellulose by cutting the long cellulose molecules shorter and disintegrating the original cellulose fibers into amorphous structures.

One currently preferred method is acid hydrolysis of o-cellulose in order to produce microcrystalline cellulose that has polymerization degree between 200 and 1000 ^jj^-glucose units, preferably between 300 and 500

Another currently preferred cutting method is enzymatic. Cellulose fragment gel forms very strong nanocomposite with CNTs and HNTs. We have found that in the presence of CNTs and nanoparticles, individual molecular fragments of chemically, enzymatically, or biologically fragmented cellulose will be separated and reassembled around CNTs and nanoparticles. This form of fragmented cellulose is currently favored for the dispersion of CNTs. This kind of product is different from other known forms of cellulose composites, and is cellulose-nanoparticle gel, and is called Celose. Cellulose fragments form an amorphous continuum, and the material is mechanically very strong, cellulose fragment-nanoparticle gel is essential for the present invention, and separates it from the prior art that utilizes various forms of cellulose. Carboxymethyl cellulose alone or mixed with cellulose gives good results, but we found that cellulose fragment gel is clearly better. In cellulose fiber hundreds of cellulose molecules are bound together. If cellulose fibers are used as carrier material for CNTs, only the surface of the fibers will be utilized, and the CNT/cellulose mass ratio is small. Despite of small CNT/cellulose ratio the CNTs are not well separated in two directions, although they are excessively separated in third direction (FIG. 1). The situation will be improved, if microfibrillated or nanocellulose will be used. Even nanocellulose has tens of (cut) cellulose molecules in one nanofiber. In cellulose fragment gel molecules are equally separated in all directions, and separation can adjusted at molecular accuracy by choosing the desired CNT/cellulose ratio. Cellulose fragments interact individually with CNTs by wrapping around the CNTs.

Thus, the CNT/cellulose ratio will be maximized. Although nano-, and microparticles are useful for the dispersion they are not mandatory, especially for the short chained cellulose fragments, such as some forms of microcrystalline cellulose. Organic ionic solvents are good solvents for both cellulose and CNTs. Their high price is a serious drawback for several practical applications. Also during various deposition processes some CNTs and cellulose molecules form homoaggregates. The same problem is encountered with many other methods, in which cellulose is solubilized. When molecular components are well solvated, their mutual interaction in solution is suppressed. While solubilized cellulose is not properly wrapping CNTs, and deposition results at least into partial phase separation. When the deposition is induced by an outside effect, the product tends to be under kinetic control. In the method of present invention two water insoluble solids, fragmented cellulose and CNTs, are mixed in water using uneven distribution of kinetic energy that is able to separate cellulose fragments as well as CNTs from their own fibers and clusters. Cellulose molecular fragments will wrap around individual CNTs under thermodynamic control. Advantageously, nano- or microparticles will be used to enhance the effect of the kinetic energy. The resulting CNT-cellulose nanocomposite is stable enough so that the components do not separate under the conditions that are used in this invention.

The situation with various forms of cellulose is somewhat analogous to various forms of iron, such as chemically pure iron, cast iron, steel, stainless steel, and acid resistant steel. There are several subspecies of each of these. They have different mechanical properties, malleability, molding properties, chemical resistance, electrical conductivity, and magnetic properties. In some applications it might be possible to choose between two or more kinds of iron. However, in many applications only one kind of iron may be used. Similarly, we have found that out of several kinds of cellulose and its derivatives, cellulose nanoparticle gel (Celose) is best for the electrical applications of this invention, although some other forms of cellulose can be used with partial success.

In a co-owned patent application is described the fabrication of CNT-cellulose nanocomposite that contains also electrically conducting nanoparticles (J A. Virtanen and P. Moilanen, WO/2008/034939). Combination of CNTs and electrically conducting nanoparticles is not enough. For several applications, including supercapacitors and EMI protection, there must be a good electrical contact between CNTs and nanoparticles. Mixing of the components even at nanoscale does not guarantee always the good electrical contact.

The composites of the present invention are also based on CNT-cellulose nanocomposite that contains electrically conducting nanoparticles. In the present invention the methods and compositions will be provided that ensure good electrical contact between CNTs and electrically conducting nanoparticles. Thus, the full utility of electrically conducting nanoparticles is obtained.

This nanocomposite may contain also paramagnetic particles, such as magnetite particles, or these particles may be advantageously in an adjacent layer. Thus, the macrostructure will contain both electrically and magnetically active particles providing superior protection against electromagnetic interference (EMI protection).

Magnetic particles can be made from iron, nickel, or cobalt, for example. Paramagnetic particles are typically ferrites. Magnetite is one specific example.

One major class of supercapacitors utilizes carbon nanoparticles (CNPs). Because CNPs have poor electrical conductance, only thin layers can be used. Similarly one class of EMI protecting materials is based on CNPs. CNPs give a random structure that can not be the best possible structure. More control of the structure is obtained, if CNTs or graphene will be used. However, so far the results have been disappointing mainly because CNTs and graphene tend to aggregate.

Prior art, all of which are given here as reference in their entirety:

M. Ankerfors, et al., US Patent Application 20090221812
  Method for the Manufacture of Microfibrillated cellulose
  cellulose was enzymatically (endoglucanase) cut, refined, and homogenized with high pressure fluidizer/homogenizer. The resulting product is micro- (or nano) fibrous cellulose that is different from the product of the present invention. Although the methods resemble each other, the different product can be explained by the presence of CNTs and/or nanoparticles in the methods of the present invention. CNTs and nanoparticles bind individual cellulose molecules and prevent their recombination into fibers after they have been separated even temporarily.

J. Engelhardt, et. al., WO 2009/021687 A 1
  Nanoparticles of amorphous cellulose
  Fabrication of amorphous cellulose nanoparticles is described by a method that resembles that of Ankerfors et al. except that chemical cleaving of cellulose is used instead of enzymatic cleaving. However, the method of Engelhardt et al. provides amorphous nanoparticles instead of nano- or microfibers. One reason is shearing and ultrasonic vibration of fragmented cellulose. In the present invention the formation of cellulose particles, even nanoparticles, is undesirable. The formation of cellulose particles is avoided, because cellulose molecules wrap around of CNTs and nanoparticles.

H. Tennent, et al., U.S. Pat. No. 856,657

Graphitic nanofibers in electrochemical capacitors.

The capacitor in which nanofibers are coated with a thin coating layer of carbonaceous polymer. Polymer can be cellulosic polymer. However, no example is given.

C. Niu, et al., Appl. Phys. Lett. 70 (1997) 1480

CNT electrodes for high power electrochemical capacitors

P. Glatkowski, et al., U.S. Pat. No. 6,265,466

EMI shielding composite containing CNTs and polymer is described. Disclosure and examples limit the concentration of CNTs to 15%. Higher concentration require new methods, such as described in the present invention that allows any concentration between 0 and 100%. Glatkowski et al. require also orientation of CNTs by a shearing force. The present invention provides so good dispersion that enough CNTs will be oriented into every direction for EMI protection.

W. Li, H. Probstle, and J. Fricke, J. Non-Crystalline Solids 325 (2003) 1.

carbon aerogel supercapacitor is described.

C. H. Cooper et al., US Patent Application 20050272856 Jul. 7, 2004

CNT containing materials and articles containing such materials for altering electromagnetic radiation, Claims are limited for the case, in which the length of CNTs is more than half the wavelength. In the present invention this requirement is not necessary. As a matter of fact the CNTs that are one hundredth of this limit work well, when the present method is used. This will make the materials of the present invention much more economical.

P J. Glatkowski, et al., U.S. Pat. No. 7,118,693 Oct. 10, 2006

Conformal coatings comprising CNTs.

Figure 20:
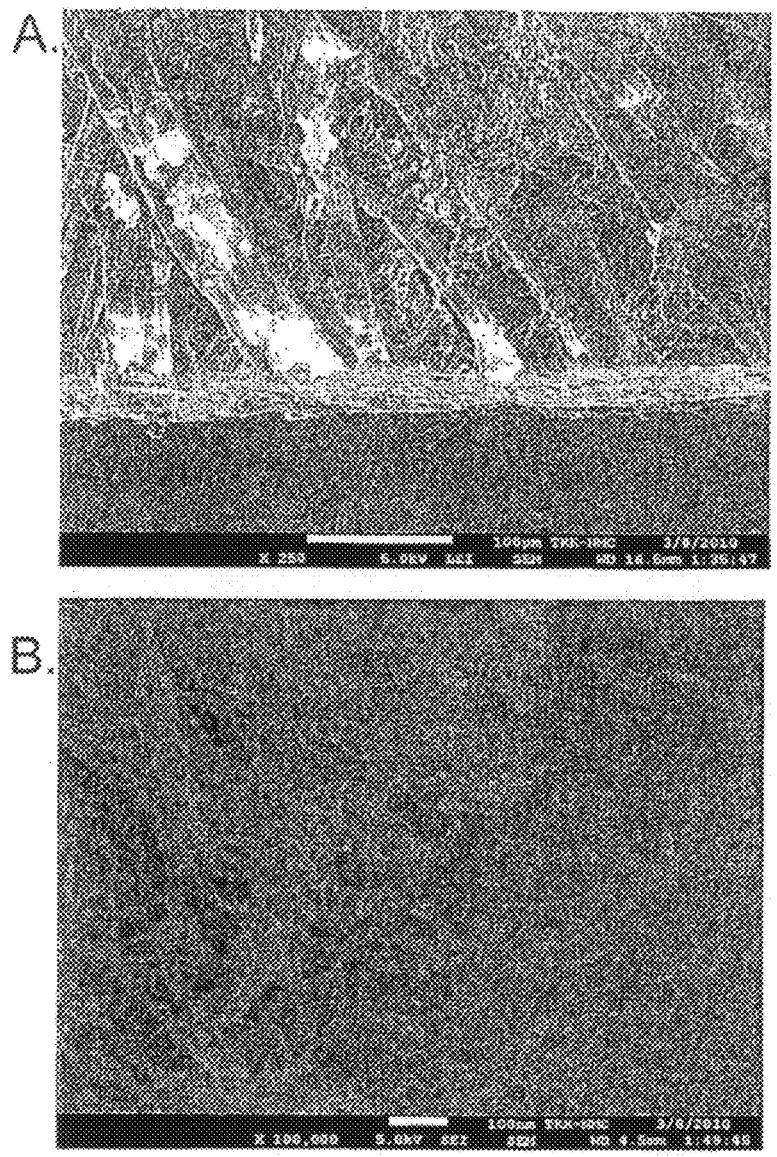
Figure 8:
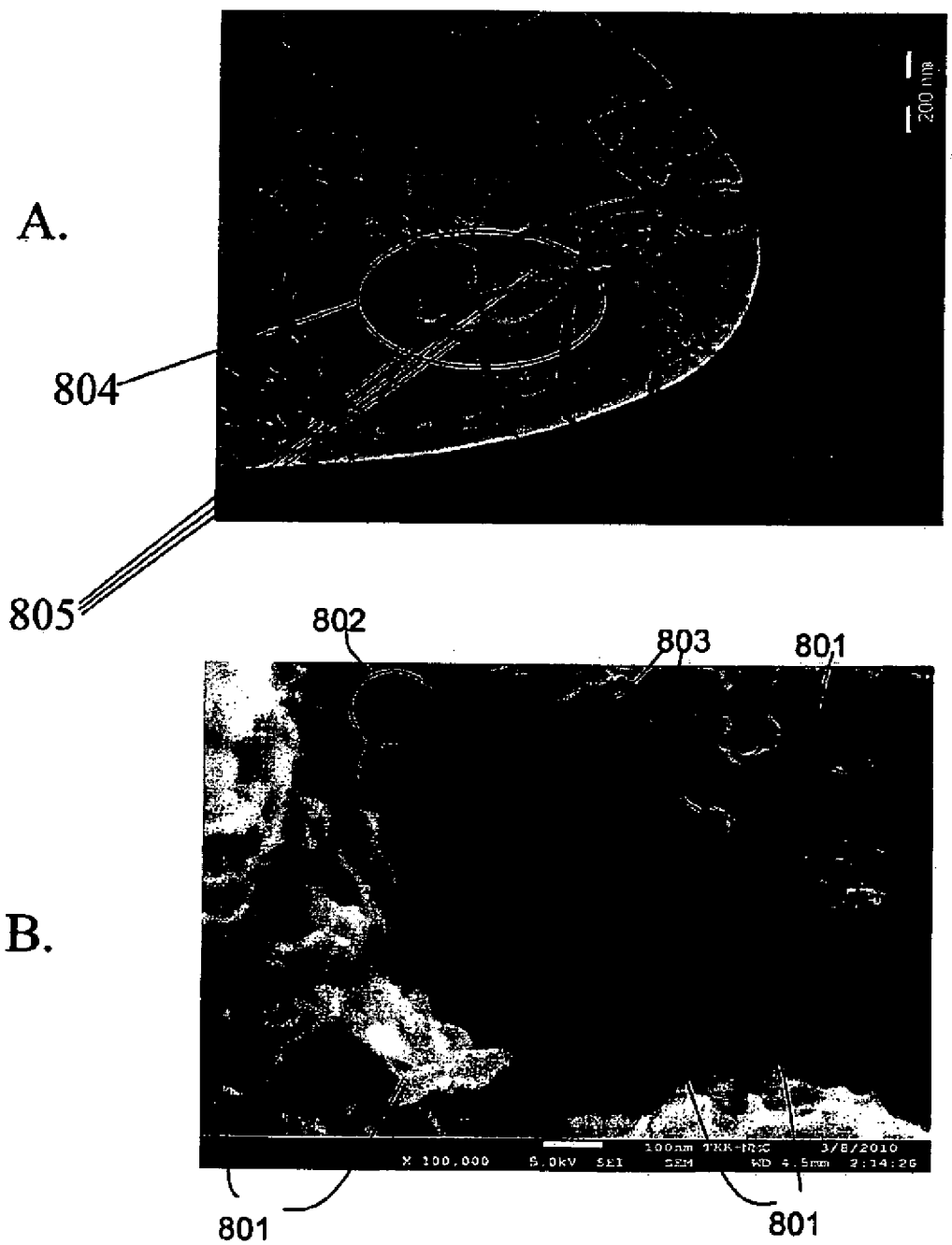
Figure 11:
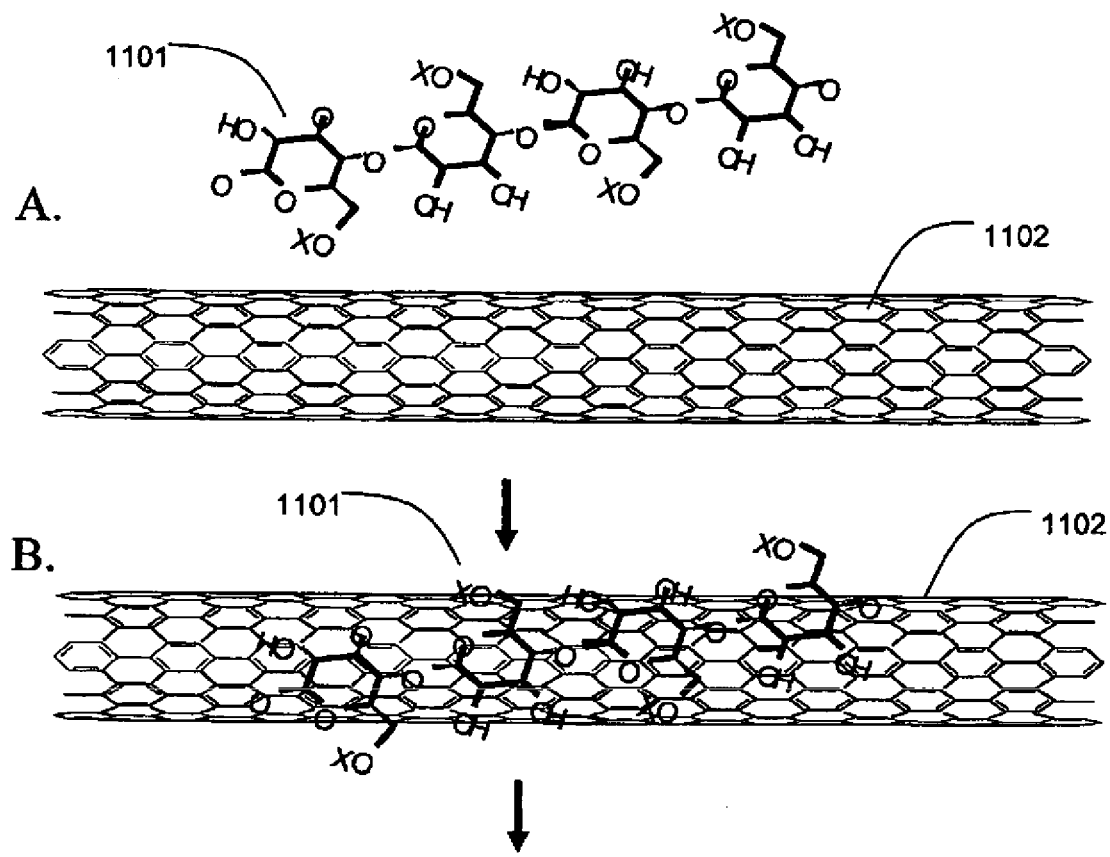

CNT diameter is claimed to be smaller than 3.5 nm that essentially requires that the CNTs are SWNTs. Very low loadings were used that are far lower than optimal concentration. One reason that can be the inefficient dispersion of CNTs over 1% and difficult dispersion over 10%. cellulose is mentioned as a possible polymer, but is not described in Experimental section. Sonication of CNTs into toluene solution, and mixing this solution with epoxy, polyurethane, acrylic, or silicone coatings was described by Glatkowski et al. cellulose was not an example. Repeating the method of Glatkowski et al. for cellulose was performed by the inventors of this invention. CNTs were dispersed either into water or 2-propanol in the absence or presence of cellulose. One typical example is in FIG. 20. The results were very different from those of the present invention. In FIG. 20 cellulose fibers are virtually intact (FIG. 20 A), and CNTs are lying on the surface of cellulose fibers (FIG. 20 B, schematics in FIG. 1 A). Thus, the EMI shielding efficacy obtained by Glatkowski et al. is limited by dispersion method.

P J. Glatkowski, et al., U.S. Pat. No. 7,118,693

Conformal EMI shielding coating is described. CNTs have outer diameter 3.5 nm or less, while in the present invention the diameter is 3.5 nm or more. Glatkowski et al. require also insulating layer. While one embodiment of the present invention also contains CNT-polymer layer and an insulating layer that layer contains magnetically active particles. A three layer structure of the present invention has an insulating layer sandwiched between two CNT-polymer layers, and destructive interference of electromagnetic radiation is created between two CNT-polymer layers. This is totally new effect that is not described by Glatkowski et al.

C. Du and N. Pan, nanotechnology 17(2006)5314

Electrophoretic deposition of carbon nanotubes on electrodes is described.

C.-C. Hu, et al., J. Phys. Chem. Solids 68 (2007) 2353.

Modification of MWNTs for electric double-layer capacitors.

S. Yoshimitsu, U.S. Pat. No. 7,382,601 Jun. 3, 2008

Electric double layer capacitor and method of manufacturing same.

Incorporating fullerene into CNT electrodes by microwave radiation is described.

J. S. Douglas, US Patent Application 20080044651

A coating or ink comprising CNTs is described. Dispersion may also contain nanoparticles and polymers including cellulose, cellulose is only mentioned by name without further definition or enabling embodiments. Also surface roughness is required to be about 100 nm or less. This is almost impossible to achieve with a mixture CNTs and cellulose, because both are fibrous solids.

W. Lu and H. Kent Douglas, US Patent Application 20080192407

Ultracapacitors with carbon nanomaterials and ionic liquids.

Ionic liquids are used as electrolytes. Polymers are carrier materials so that the supercapacitor is largely solid. Inorganic material is used to prevent crystallization of polymeric material.

P. M. Ajayan, et al., US Patent Application 20080212261

Energy storage devices and composite articles associated with the same.

Method claims of Ajayan et al. require polymer is dissolved into a liquid. That is in sharp contrast of the present invention, in which the polymer is advantageously poorly soluble into the liquid. Importantly, no kinetic energy input is mentioned in disclosure or in any embodiments.

US Patent Application 20080254362

Nano-Composite structures, methods of making, and use thereof.

Nanocomposite containing CNTs and semiconducting or metallic nanoparticles is described. Also polymeric binder may be included. Apparently no polymers are defined in the disclosure, and no examples of their use is given. However, several specific polymers are claimed, but cellulose is not included.

U.S. Pat. No. 7,553,341 Jun. 30, 2009

High power density supercapacitors with carbon nanotube electrodes.

Electrophoretic deposition of CNTs.

J. S. Glatkowski, et al., US Patent Application 20090131554

EMI shielding CNT-polymer composite is provided. In strong contrast with present invention the composite has low or essentially no bulk conductivity. Glatkowski et al. realized that entanglement of CNTs is essential for good EMI protection. Entanglement is difficult to obtain with high loadings. This problem has been solved in the present invention, and high concentrations of CNTs can be used, and CNT-polymer nanocomposite has also good bulk conductivity.

K.-L. Jiang and S.-S. Fan, US Patent Application 20090168302

Electrochemical capacitor with CNTs.

Use of cellulose in porous middle membrane is mentioned. However, Membrane is not integrated with CNT layers.

J.-H. Kwon, et al, U.S. Pat. No. 7,588,700

Specific EMI shielding material comprising epoxy or polyimide resin and CNTs that contain both C=O and N—H functionalities. Composition may further comprise metal particles.

A. G. Rinzler, et al., U.S. Pat. No. 7,704,479

Highly accessible, nanotube electrodes for large surface area contact applications.

Fabrication of porous CNT-membrane is described. Sacrificial nano- or microparticles are used. These particles will be removed after the fabrication of a film. Dispersion method is not specified, but the requirement is that CNTs and particles do not flocculate from suspension. This is in sharp contrast to the present invention, in which the CNT-polymer-nanoparticle nanocomposite flocculates advantageously from suspension. Also in the present invention nano- or microparticles will be used to focus kinetic energy, and they must have density that is advantageously twice that of the solvent. Rinzler et al. use nano-, and microparticles only as spacers, and the density is not important, unlike in the present invention.

FIGURE CAPTIONS

FIG. 1. Schematic cross-section of A. CNT-cellulose composite, in which CNTs have been deposited onto a cellulose fiber surface, B. CNT-cellulose nanocomposite, in which components are mixed at molecular scale.

Figure 2:
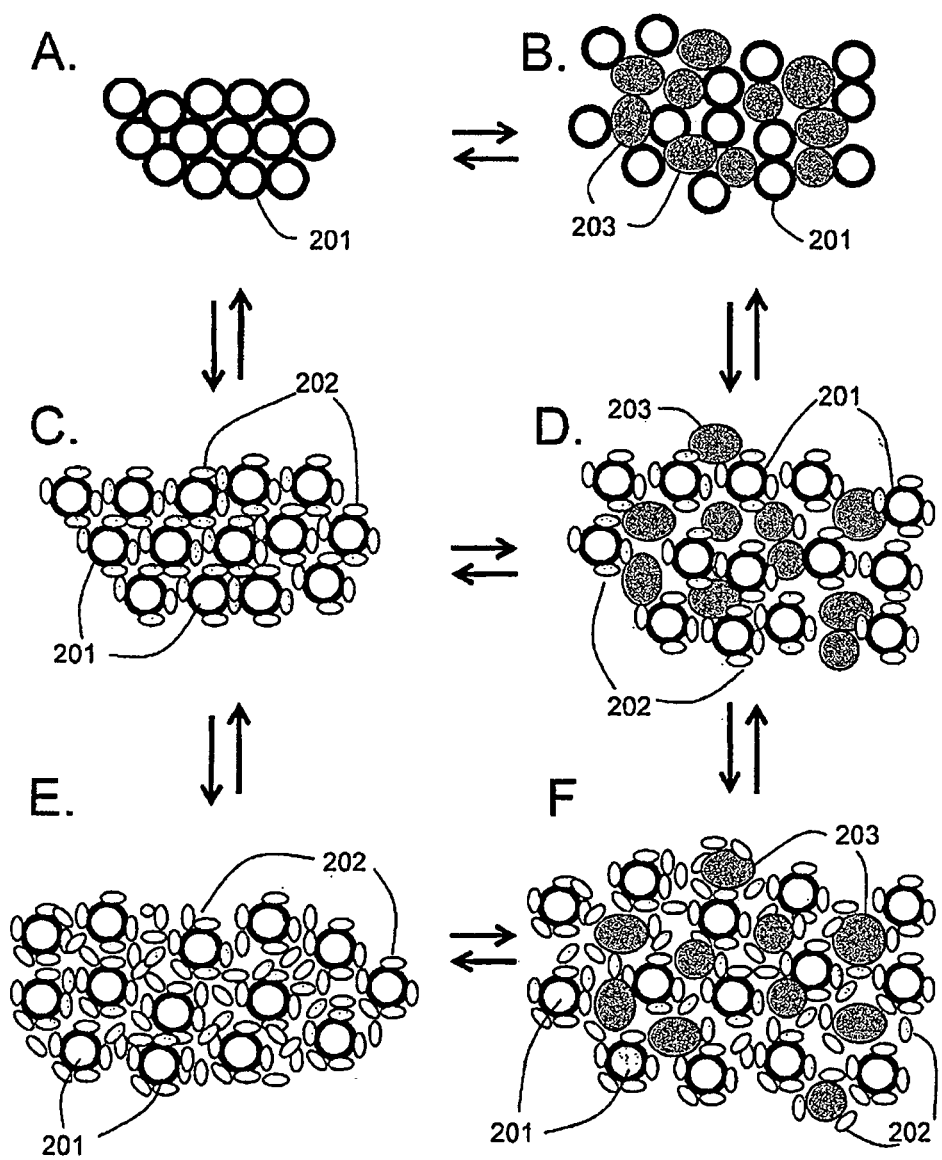

FIG. 2. Schematic depiction of fabrication (F to A) of nanocomposite of this invention, and final control of the composition (reverse direction, i.e., A to F, but not necessarily in alphabetical order).

Figure 3:
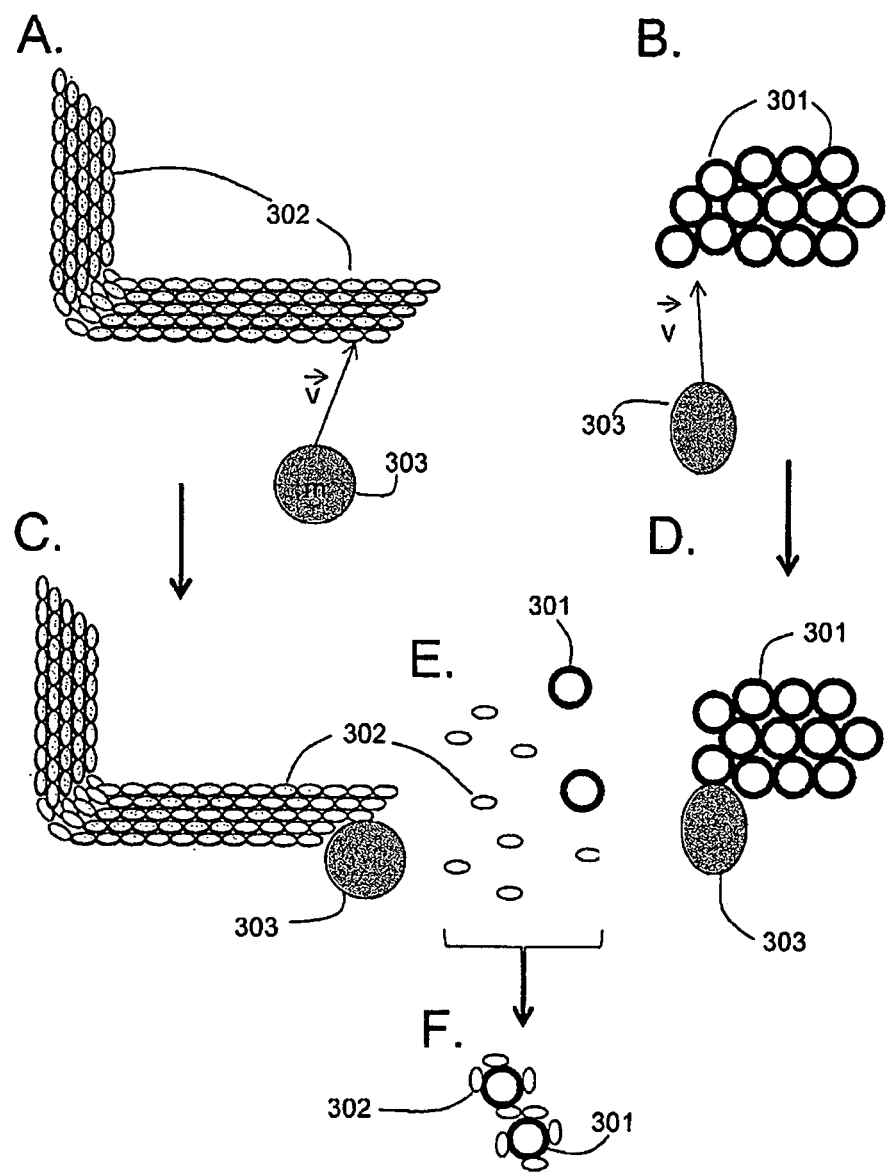

FIG. 3. Schematic depiction of kinetic energy focusing at molecular level by using nanoparticles.

Figure 4:
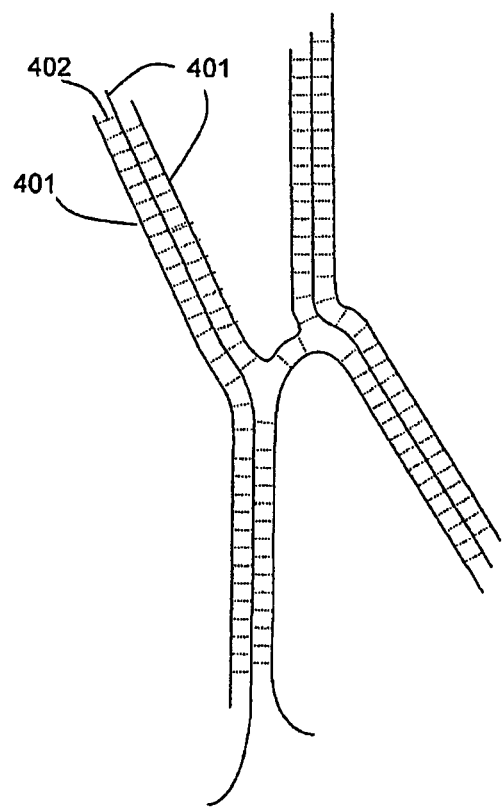

FIG. 4. Schematics of binding of cellulose fragments via hydrogen bonded segments. Each fragment can change direction suddenly, and bind with several different other cellulose fragments.

Figure 5:
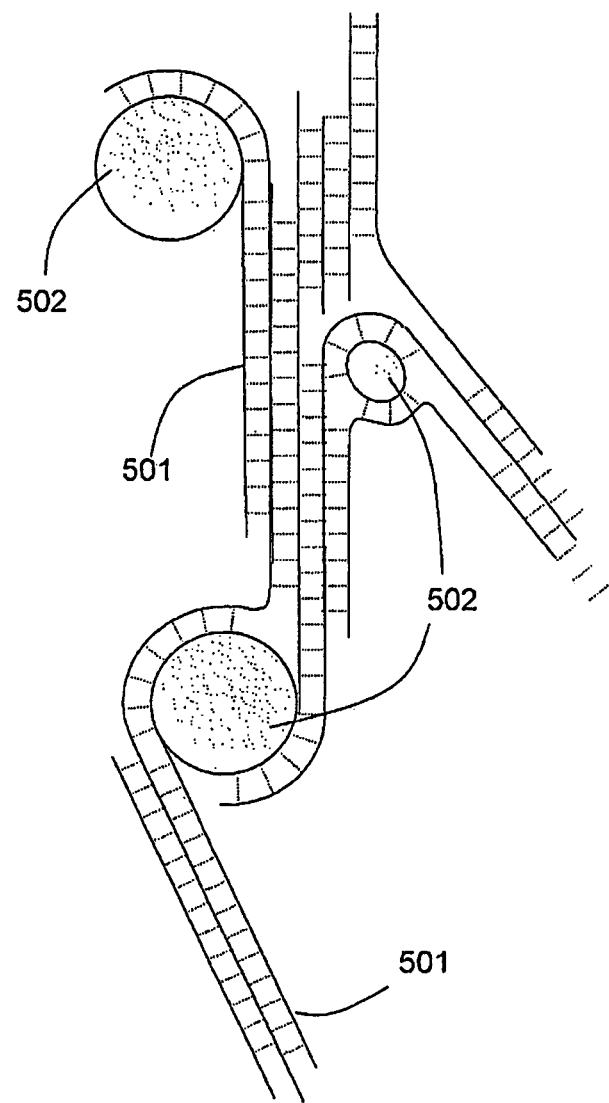

FIG. 5. Schematics of a structure of cellulose fragment-nanoparticle nanocomposite or gel.

Figure 6:
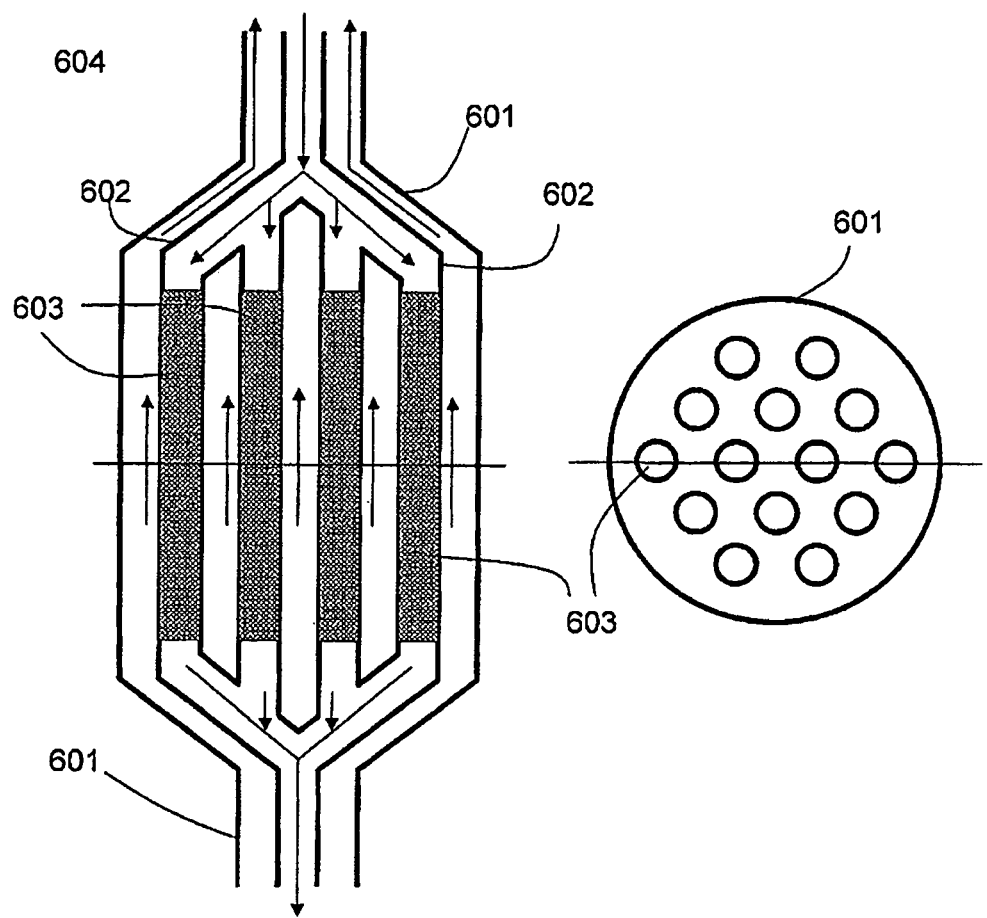

FIG. 6. Schematics of one embodiment of a countercurrent flow reactor that can be used to fabricate CNT-cellulose fragment gel of this invention.

Figure 7:
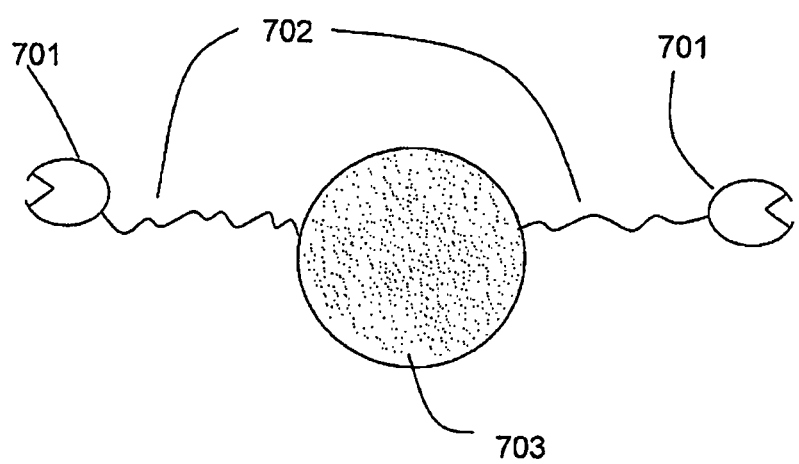

FIG. 7. Schematics of a micro- or nanoparticle that is at least partially coated with enzymes.

Figure 8:
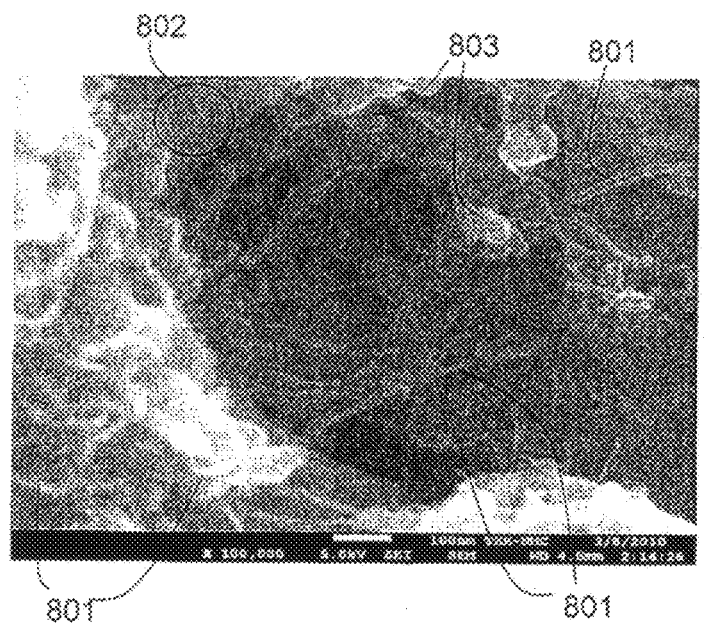

FIG. 8. TEM image (A), scale bar is 200 nm and SEM (B) image of amorphous CNT-cellulose-nanoparticle nanocomposite of this invention, 100 000 fold magnification.

Figure 9:
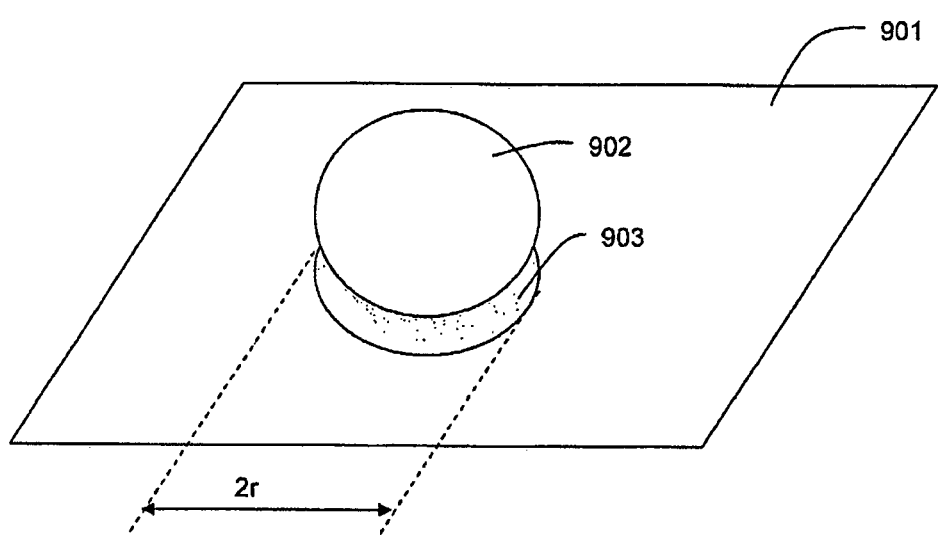

FIG. 9. Schematic demonstration of the increase of the area achieved by coating a flat surface by spherical particles.

Figure 10:
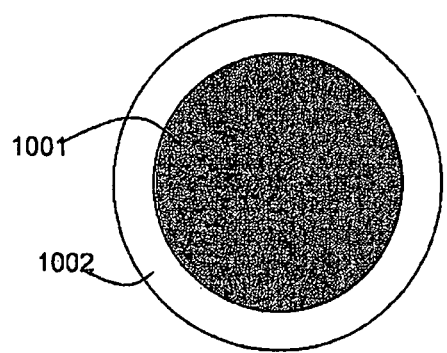

FIG. 10. Schematic depiction of a particle 1001 that is coated with a layer 1002.

Figure 11:
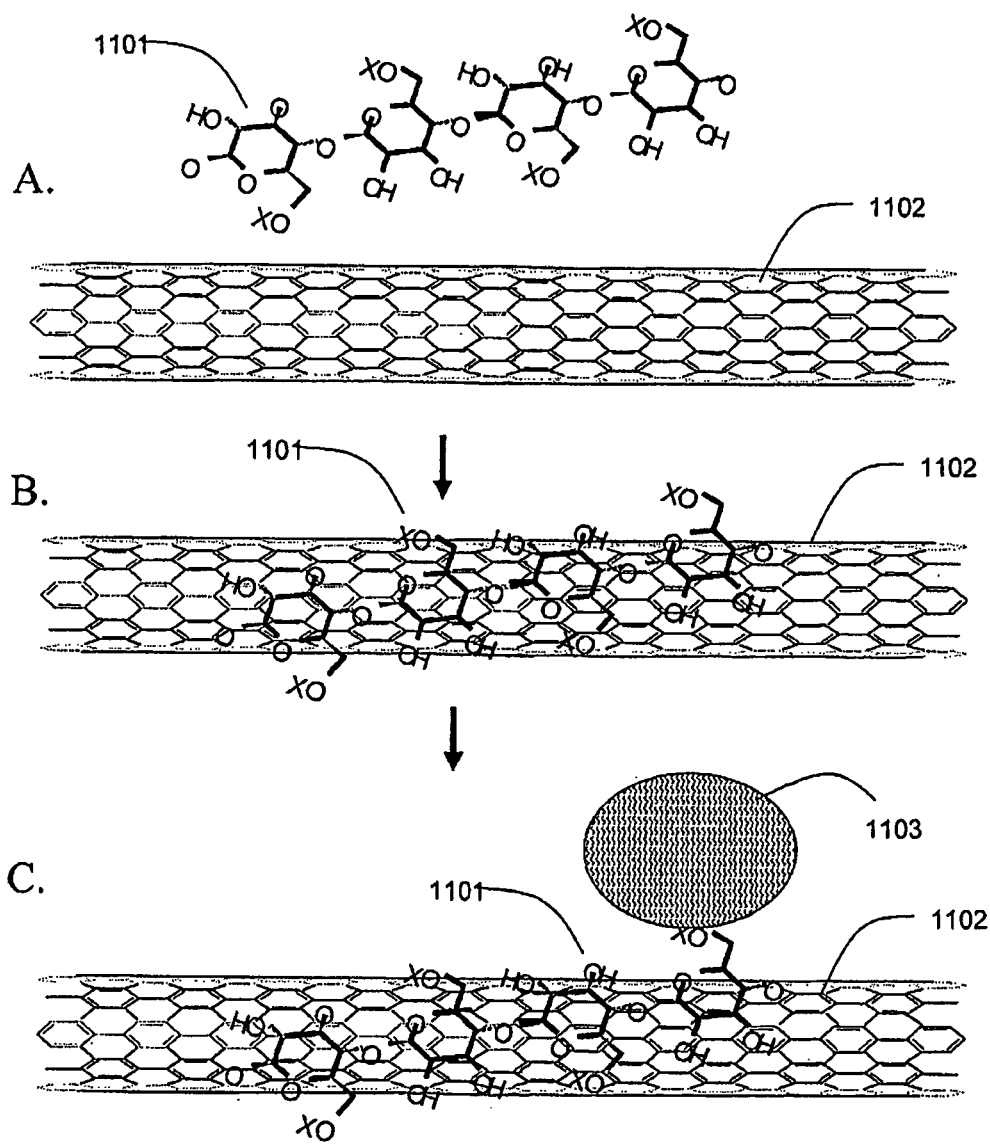
Figure 11:
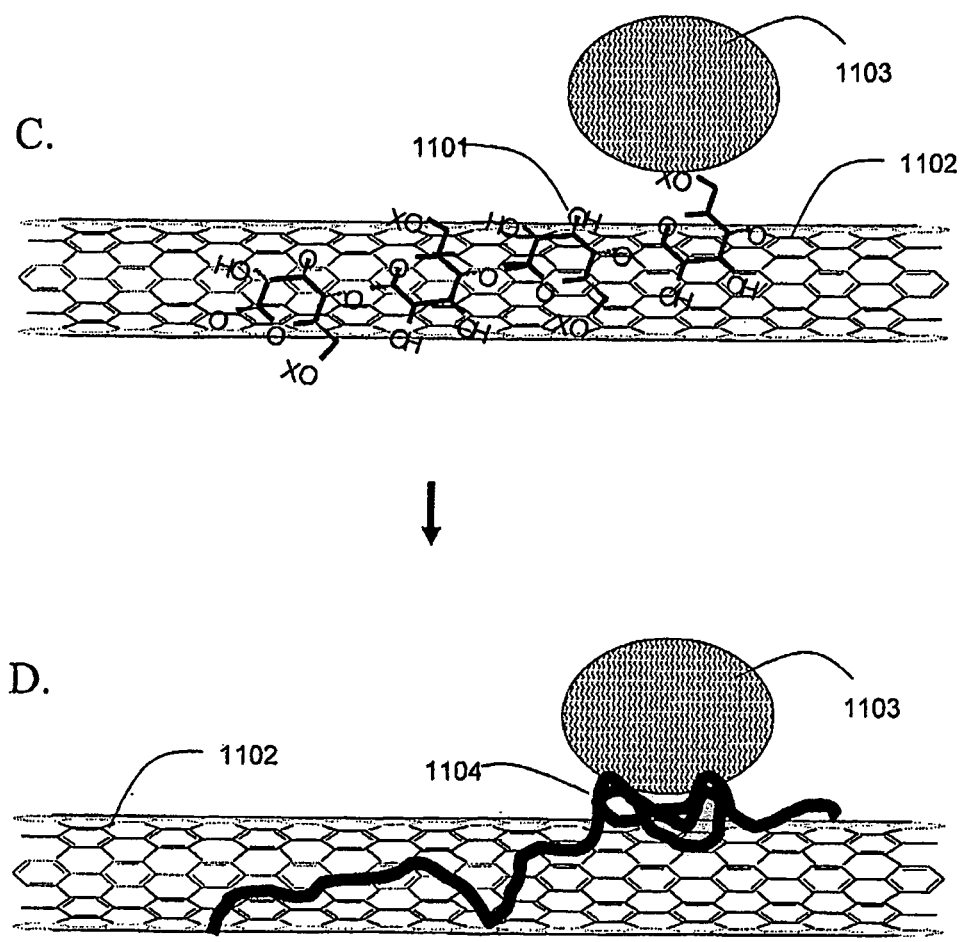

FIG. 11. Schematic depiction of one embodiment of the nanocomposite fabrication method. A. Functionalized cellulose 1101 and carbon nanotube 1102, B. Combination of CNT and functionalized cellulose. C. Precursor nanoparticle 1103 is attached with functionalized cellulose. D. Amorphous carbon 1104 is formed from functionalized cellulose 1101 after pyrolysis, and precursor nanoparticle is enlarged and attached with CNT 1102

Figure 12:
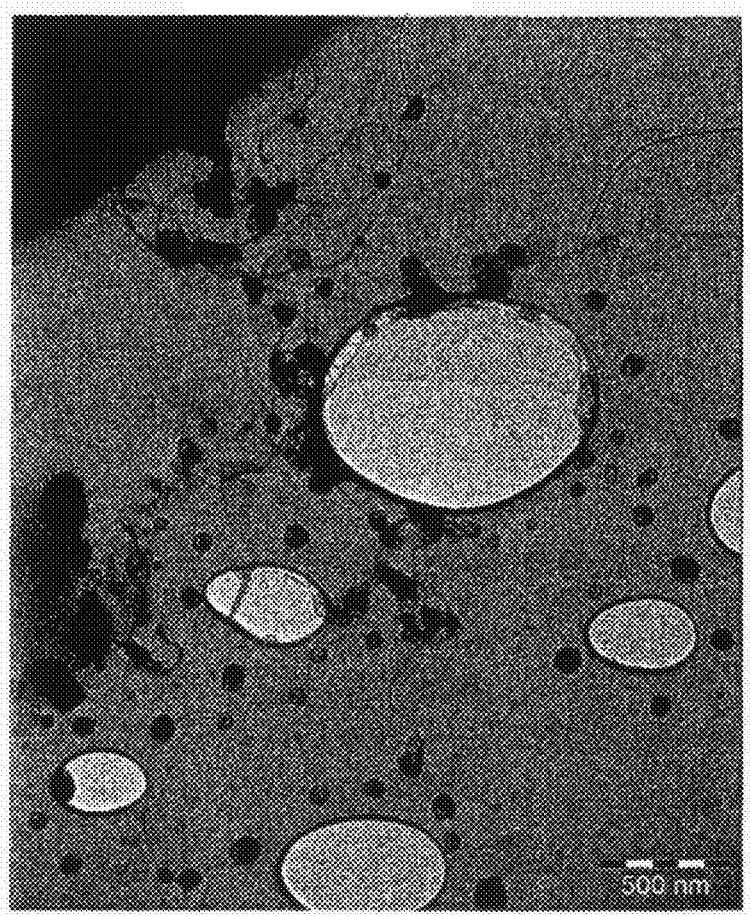

FIG. 12. TEM micrograph of M WNT-cellulose-CMC-Prussian Blue nanocomposite. Prussian blue nanoparticle 1201, carbon nanotube 1202

Figure 13:
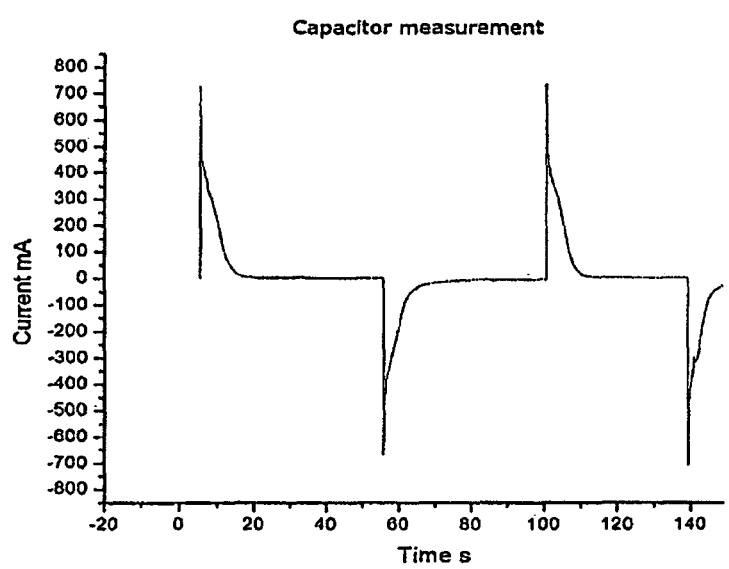

FIG. 13. Graph of charging cycles of a supercapacitor that was made of MWNT-cellulose-CMC-Prussian Blue gel.

Figure 14:
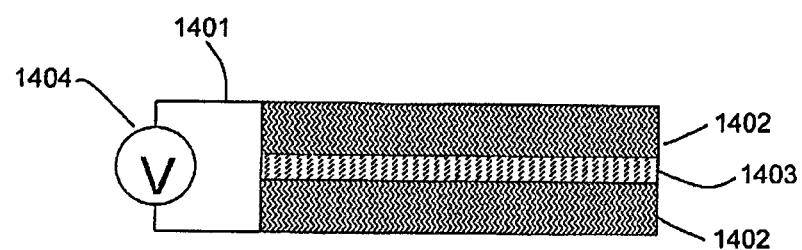

FIG. 14. Schematics of one embodiment of the present invention. Two layers of CNT-molecular cellulose-nanoparticle nanocomposite 1402 of the invention are separated by an ion permeable membrane 1403. The electric wires 1401 are connected directly with nanocomposite layers 1402, and no separate electrodes will be needed.

Figure 15:
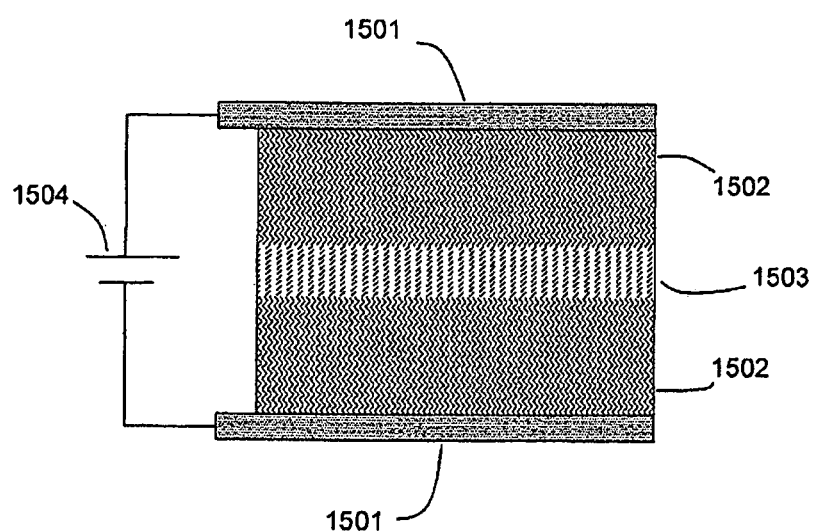

FIG. 15. Schematics of another embodiment of the present invention, in which CNT-molecular cellulose-nanoparticle layers 1502 have been integrated into one continuous layer via a center layer that consists of molecular cellulose that may contain nanoparticles, but no CNTs.

Figure 16:
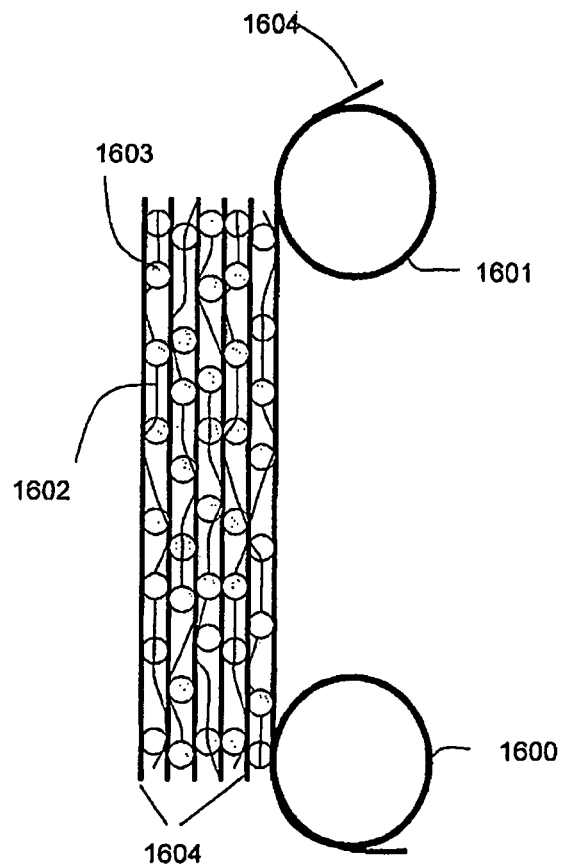

FIG. 16. Schematics of a cross-section of two CNTs 1600 and 1601 that are connected electronically by a graphite sheet 1604, that is stacked by several graphite sheets 1604. Intercalated between graphite sheets are nanoparticles 1603 and molecular cellulose fragment 1602.

Figure 17:
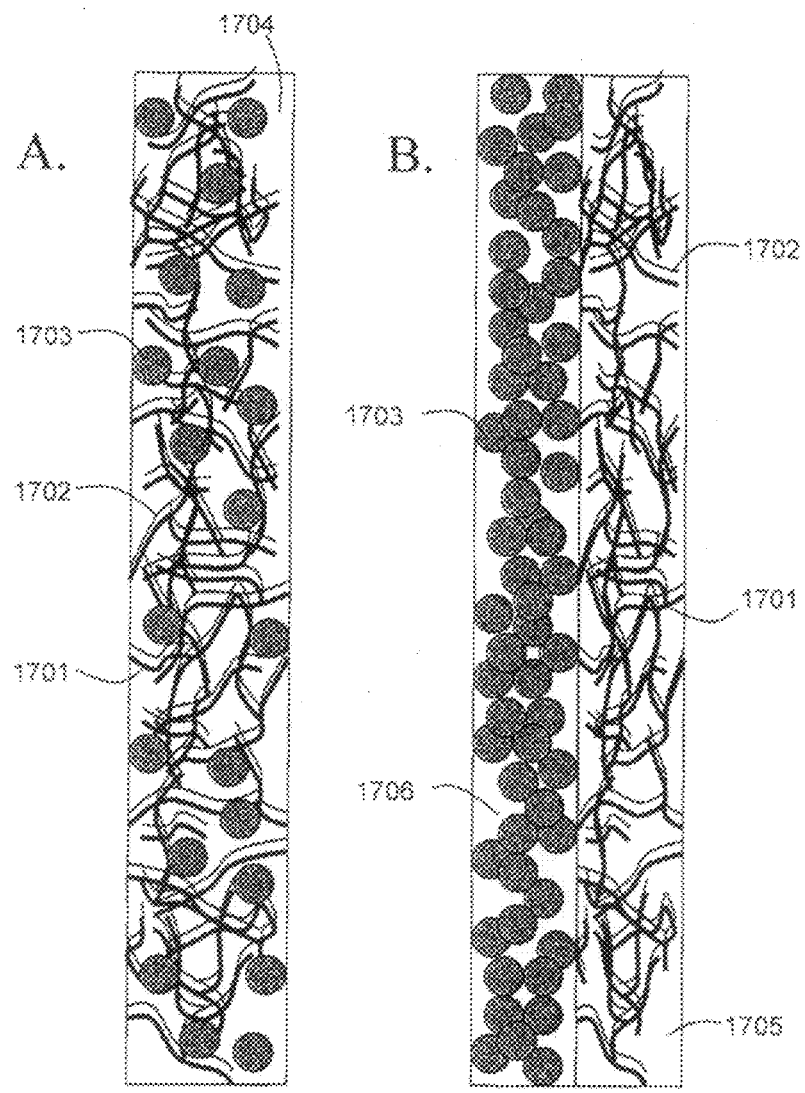

FIG. 17. Schematic structure of A., Single layer composite containing both electric 1701 and magnetic particles 1703 in the same layer, B., Double layer structure, in which the electric 1701 and magnetic particles 1703 are in different layers.

Figure 18:
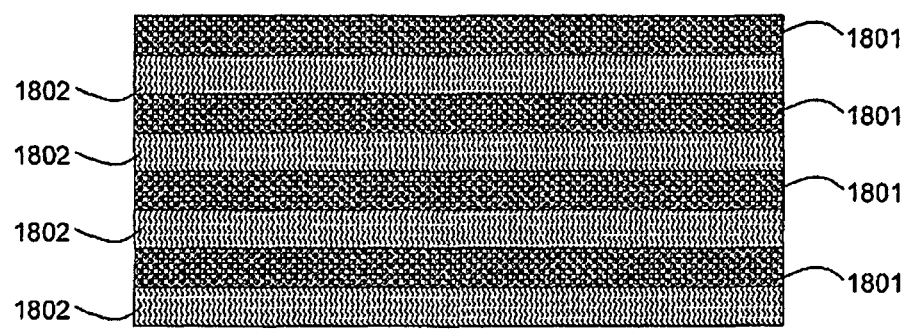

FIG. 18. Schematic depiction of multilayer alternating structure.

Figure 19:
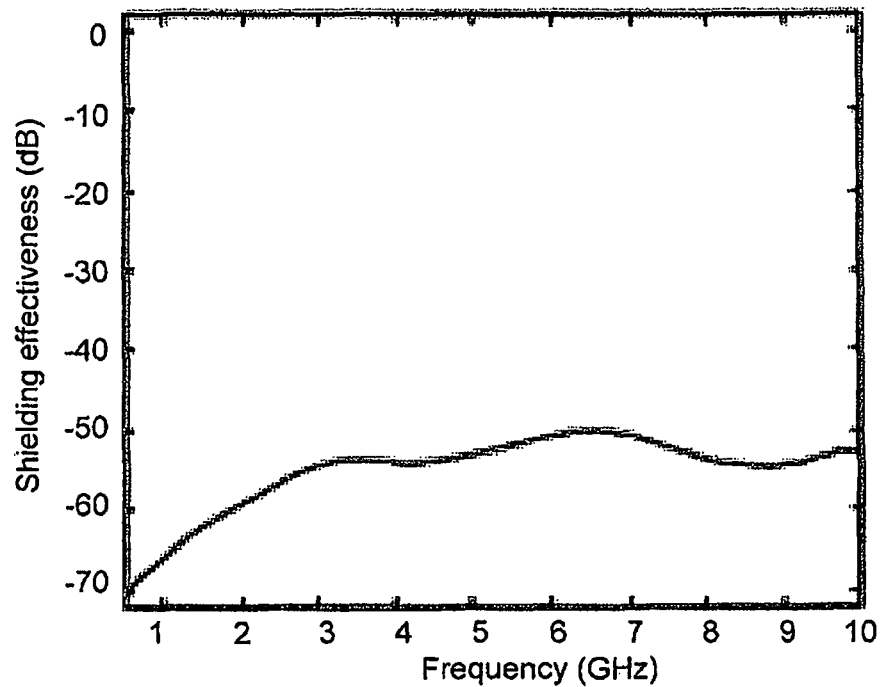

FIG. 19. Graph of EMI shielding efficiency of DWNT-fragmented cellulose paper vs. frequency.

FIG. 20. SEM images of CNT-cellulose fiber composite A. 250× magnification, and B. 100 000 magnification of the area, in which CNTs are visible. Schematic FIG. 1 A is drawn on the basis of this SEM image. This figure is provided as a reference, and does not represent the present invention.

DEFINITIONS

Cellulose fiber is a hollow fiber consisting thousands of cellulose molecules.

Nanocellulose is a nanofiber consisting of tens of cellulose molecules, diameter is about 5 nm.

Cellulose molecule is less than 1 nm thick, and several micrometers long.

In common language cellulose refers often to a pulp consisting of cellulose fibers. In this disclosure cellulose means individual cellulose molecules.

Cellulose fragment has between 200 and 4000 glucose units.

Amorphous cellulose does not have crystalline or even fibrous structure, and no long range order. Few molecules can run parallel a short distance (FIG. 4).

Cellulose gel is amorphous cellulose that contains solvent.

Cellulosic material is any polymer or oligomer fabricated from cellulose.

Nanoparticle has a diameter between 10 and 100 nm.

Graphitic material consists almost entirely of sp2 hybridized carbon atoms arranged into hexagonal network. Some heteroatoms may be especially at the edges. Examples are graphite, graphite, carbon nanotubes, and nanohorns.

Material is slightly soluble, if the solubility is less than 0.5% (w/w) as molecules.

Material is sparingly soluble, if the solubility is less than 0.05% (w/w) as molecules.

Acronyms:
CAP is cellulose acetate propionate
CMC is carboxymethyl cellulose
CNP is carbon nanoparticle
CNT is carbon nanotube
EMI is electromagnetic interference
ESD is electrostatic dissipation
HNT is Hybride nanotube, HNT will include CNTs unless otherwise specified.

SUMMARY OF THE PRESENT INVENTION

The present invention provides methods for the fabrication of nanocomposites and hybride materials from two materials in a liquid into which both materials are slightly or sparingly soluble.

The present invention provides methods and compositions for the efficient, fast, and economical fabrication of polymer-graphitic material nanocomposites using nanoparticles for the facilitation of dispersion especially, if both materials are sparingly soluble.

In the currently preferred method polymer is cellulose or modified cellulose, and graphitic material consists of CNTs or functionalized CNTs, and CNT/cellulose ratio is more than 1:10.

In another currently preferred embodiment CNTs, chemically or enzymatically cut cellulose, and nanoparticles, such as calcium carbonate nanoparticles, will be first mechanically mixed, and then hydrodynamically mixed so that the amount of CNTs and cellulose is about equal, and the amount of nanoparticles is more than the combined amount of CNTs and cellulose. Depending on actual components and applications the relative amounts can be varied considerably.

Still another embodiment allows to increase the concentration of CNTs by the partial or total removal of some nanoparticles, such as calcium carbonate nanoparticles, by acid treatment, and partial or total removal of cellulose by pyrolysis that generates only volatile components. CNT concentration can be increased up to 100%, but in order to avoid reaggregation CNT concentration will be preferably under 75%.

In one aspect of the present invention the materials of the present invention can be advantageously used in supercapacitors, for EMI protection, and dispersion of graphitic materials into other polymers.

In one embodiment that is especially useful for EMI protection the material may contain magnetic or paramagnetic nanoparticles.

In another embodiment of the present invention the material that is useful for supercapacitors, contains electrically active nanoparticles, such as magnetite, Prussian blue, cobalt oxide, lead(II,II,IV)oxide, carbon nanoparticles, ruthenium oxide, titanium oxide, tin oxide, or manganese oxide In one advantageous embodiment of the present invention cellulose derivatives, such as cellulose fragment gel, cellulose acetate, nitrate, methyl cellulose, carboxymethyl cellulose, or ethyleneoxide cellulose are mixed or reacted with HNTs. In one currently preferred embodiment the cellulose derivative is cellulose acetate propionate that can be melted without decomposition, and the HNTs can be mixed with the melted cellulose derivative without using any solvents. Magnetic or paramagnetic nanoparticles can be deposited or mixed with these composites.

It is a further aspect of the present invention to improve the mechanical properties by chemical cross-linking cellulose or functionalized cellulose with I-INTs and/or I-INTs with each other, and magnetic nanoparticles Cross-linked material is hybride material.

In one embodiment the HNT-cellulose fragment gel that is used in supercapacitors is also mechanically strong so that is also a structural component in various devices and vehicles, while the main purpose is storing electricity. Mechanical strength can be further increased by carbon fibers that will also have dual function, because they are able to distribute electric current evenly into a supercapacitor.

In another aspect of the present invention, a supercapacitor is electrically connected with two or three electrical potential sources. The first potential source is used to charge the supercapacitor. The second potential source forms a closed circuit with the first electrode of the supercapacitor. Optionally, the third potential source forms a closed circuit with the second electrode of the supercapacitor. This kind of supercapacitor may be flat, cylindrical, or some other form, and can be used to conduct electricity longitudinally.

In still another aspect of the present invention a layered structure is formed from HNT-cellulose nanocomposite and a dielectric material. If dielectric material contains paramagnetic material, a dual layer structure is useful. If no paramagnetic particles are included, a triple layer structure, in which dielectric layer is sandwiched between two HNT-cellulose nanocomposite layers is useful. This kind of layered structure can be used advantageously for the protection against electromagnetic interference (EMI).

In one advantageous embodiment HNT-cellulose nanocomposite is embedded inside a thermoplastic or thermoset resin, combining good material properties and EMI protection, and possibly also electrical storage.

DETAILED DESCRIPTION OF THE PRESENT INVENTION

Fabrication of graphitic material-polymer nanocomposite
The present invention provides graphitic material-polymer nanocomposites, in which individual molecules of graphitic material will not be clustered. Thus, a full utility of graphitic material for many applications will be obtained. In most currently preferred embodiments graphitic material consists of CNTs, and polymer is cellulose or modified cellulose.

The essence of one embodiment of the present invention is a material, in which graphitic material 101 (CNTs in FIG. 1) is wrapped in molecular polymer 102 so that the surface of the graphitic material is maximally exposed at molecular level, i.e., it is not covered by another graphitic molecule, except at small areas that provide bulk conductivity. In these examples polymer is cellulose or fragmented cellulose, cellulose provides a porous and hydrophilic structure, in which several types nanoparticles can be incorporated. Also ions can move easily in a porous and hydrophilic milieu. The distance of graphitic material particles can be adjusted very accurately by the mass ratio of graphitic material and fragmented cellulose provided that fragmented cellulose is not clustered (FIG. 1 B.). This is achieved by cutting cellulose fibers chemically, biochemically, biologically, and/or physically. Advantageously, dispersion is done in the presence of nano- or microparticles, such as alumina, silica, calcium carbonate, calcium sulfate, calcium phosphate, iron phosphate, iron oxide (ferrite), tin oxide, titanium oxide, or zinc oxide. These particles amplify the dispersion of graphitic material and cellulose, and act as spacers that prevent their recombination into homoclusters. Some of these nanoparticles are electromagnetically useful in applications. Fabrication is depicted in FIG. 2, in which cross-sections of the components are shown for simplicity. CNTs are examples of graphitic material, and the cross-section of a CNT is a circle 201. FIG. 2 A depicts a bundle of CNTs. Nanoparticles 203 are added from left to right (FIGS. 2 A to B, C to D, and E to F). Molecular cellulose is added downward (FIGS. 2 A to C, B to D, C to E, and D to F). In the fabrication methods of this invention all these components are present at the same time, because positive cooperative effect, nanoparticles 203 would not mix very well with CNTs 201. However, their high relative density promotes detachment of molecular cellulose 202 from cellulose fibers, and cellulose encapsulates both CNTs and nanoparticles.

Dispersion and the resulting interaction of two insoluble solids, graphitic material and cellulose, is achieved in this invention by using unevenly distributed kinetic energy. Many forms of mechanical or hydrodynamic mixing can be used, including blade mills, ball mills, millstones, blasting with ceramic or polymeric particles, powerful liquid jets, and ultrasonic vibration. In one currently favored method the cellulosic material is mixed with graphitic material, alumina nanoparticles, and enzyme, such as endocellobiose, or chemicals, such as sodium hypochlorite, in water and milled with very fast blades. The mixture is further subjected into ultrasonic vibration. Nano- and microparticles have much higher density than the solvent, cellulose, or CNTs. They will greatly amplify the mixing effect, and will make the large scale fabrication of CNT-cellulose nanocomposite economical and practical. Nano- and microparticles can be considered as kinetic energy concentrators that can focus the kinetic energy to individual molecules, CNTs (FIG. 3 B), and cellulose fragments (FIG. 3 A, cellulose fiber has already been cut mechanically). Kinetic energy is required for the separation of individual cellulose molecular fragments and CNTs (FIG. 3 E) or other graphitic particles. Because they are sparsely soluble into water, or other solvents that can be used in this context, they will recombine very fast, and under these conditions they combine often to form CNT-cellulose nanocomposite (FIG. 3 F), in which cellulose fragment molecules are helically wrapped around CNTs. Cellulose is not only amorphous, but is molecular form, i.e., divided into smallest possible units that are molecules. Cellulose fragment molecules are not easily detached any more from the CNTs. This method works really well, when cellulose is partially cut. Intact cellulose is very difficult to separate as individual molecules. Although detergents will be avoided, but not totally forbidden in conjunction of the present invention, some other soluble agents that will help partial dissolution of the starting materials may be used. Examples are polyvinyl alcohol, polyallyl amine, CMC, starch, and hemicellulose. SEM image (FIG. 8 B) proves that cellulose does not form fibers or crystallites in this material. Most of material surface is structureless and resembles the circled area 802. This image is taken from a hole, in which several features can be seen. CNTs are in this image similar to sparsely deposited CNTs (not shown), expect that they are coated by a thin layer of molecular cellulose. Thicker layer will appear white. Some nanoparticles (calcium carbonate) 803 are also visible. The material is amorphous, and is very different from microfibrillated cellulose or nanocellulose. TEM image (FIG. 8 A) is taken from same sample. The coating layer of cellulose is very readily visible in circled area 804. Cellulose can be seen as uneven shape around very well visible edges of MWCNT's 805. Microcrystalline cellulose can also be advantageously used as a starting material. Microcrystalline cellulose is obtained from o-cellulose by acid hydrolysis. Kinetic energy is directly proportional to the mass m and second power of the velocity of the particle 303 (FIG. 3 A). Nanoparticles follow the liquid flow very closely. If the kinetic energy of a nanoparticle is compared with a equal volume element of a liquid, that nanoparticle can have several times bigger kinetic energy, if the density of the nanoparticle is much higher than that of liquid. Nanoparticle 303 will hit only one or few molecules, and the kinetic energy of the nanoparticles is transferred to few molecules (FIG. 3 E), while surrounding molecules experience much smaller impact from liquid. This mechanism works really well only, if the density of nano- or microparticles is considerably higher than that of the solvent. Advantageously the density of particles is at least twice the density of the solvent. This will lead to an efficient separation of molecules from a cluster or bulk material. Nanoparticles 303 will also be incorporated into the nanocomposite.

Some nanoparticles that are used during the fabrication of CNT-cellulose nanocomposite can be easily removed. For example, calcium carbonate can be removed by acid.

Calcium chloride is soluble in water and is largely or totally removed during filtration, and washing. Alumina and silica can be removed with sodium hydroxide. Because cellulose can be partially or totally removed by pyrolysis, the CNT content of the final product can be deliberately adjusted anywhere between 0-100%. This is one further aspect of the present invention. Using excess of inert solid material for the dispersion of the CNTs or other graphitic materials, gives a better dispersion (FIG. 2 F). When the excess of intervening solid is removed, CNTs will still stay separated, provided that too much of cellulose 202 and/or solid nano- or microparticles 203 will not be removed (FIG. 2 B or C). Instead of totally removing nanoparticles 203 their size can be reduced. Because nanoparticles will be incorporated into the nanocomposite, and they will be consumed, their amount is advantageously quite large, typically over 50% of the total mass. This is not mandatory, and the amount can be much smaller. Large amount of nanoparticles, such as calcium carbonate, is not problematic, because many of them are inexpensive, and can easily be removed by acid or base. Acid is consumed in the process of removing calcium carbonate, and the end product will be neutral. Soluble products can be filtered away. Moreover, dielectric nanoparticles act as spacers between CNTs like cellulose does.

When powerful solvents, such as ionic liquids, are used to solubilize CNTs and cellulose, they do not really separate CNTs completely, or CNTs will cluster with each other, when the ionic liquid is removed. Although cellulose will often be amorphous, when deposited form solution, it is still strongly clustered. Solubilized cellulose will wrap around CNTs only partially. This kind of method is under kinetic control, unlike the method of the present invention that is thermodynamically controlled. In kinetic control large molecules, CNTs and cellulose molecules, cluster with the molecules that happen to be closest, when deposited by lower temperature of addition of poor solvent. Partial reassociation of CNTs can not be prevented under kinetic control. Thermodynamic control gives good quality CNT-polymer nanocomposite as is evidenced by the present invention. If cellulose wrapped CNTs are thermodynamically stable, as experimental results of this invention demonstrate, virtually all CNTs will be wrapped inside cellulose. They can still have contact points that provide bulk electrical conductance.

One currently favored embodiment of the present invention provides electrically well conducting CNT or HNT network that is coated with electrically conducting nanoparticles so that there is a good electrical contact between HNTs and nanoparticles. Currently most advantageous particles are CNPs. Some other possibilities, cuprous iodide, cobalt oxide and Prussian blue. Graphene is one special type of CNP. Graphene is exfoliated graphite that has very good electrical conductivity, and surface area per gram is 2600 m2/g, if both sides of the sheet are included. CNPs can be made in several methods. One currently preferred method is to cutting HNTs very short, and then oxidizing them in nitric acid-sulfuric acid mixture even shorter. Some of them will exfoliate so that they are intermediates of HNTs and graphene.

In supercapacitors the role of nanoparticles is straightforward. The purpose is to increase the surface area that can be charged electrically. If the particle is spherical, it has the surface area that is four times larger than it covers on the HNT (FIG. 5). In addition many nanoparticles are porous, and the effective area is many times larger. Graphene is flat and can connect two or more HNTs. Contact area between graphene and CNTs is relatively large, while contact between two cylindrical CNTs is point-like and very small.

For EMI protection the role of the electromagnetically active nanoparticles is less obvious. The EMI protection can be obtained by two different mechanisms, reflection or absorption. Metals reflect electromagnetic fields. HNTs behave somewhat similarly. However, absorption is preferred. HNTs will be excited to higher energy levels by electromagnetic waves transiently, but they will relax by emitting electromagnetic waves. Part of the electromagnetic energy will be reflected back. When HNTs are coated with nanoparticles that are able to absorb the excitation energy from the HNTs, there will be minimal reflection. Nanoparticles act as sinks for the electromagnetic energy. This is the ideal situation, because it is desirable to minimize electromagnetic background from all electrical devices. Reflectors, such as metals and pure CNTs do not achieve this goal, they only redirect the electromagnetic energy.

In order to obtain the full merit of these nanoparticles, a good electrical contact between HNTs and nanoparticles is necessary. This can be obtained by various means. When CNPs are used, they are well dispersed with CNTs using a dispersing agent. Cellulose fragment gel and carboxymethyl cellulose (CMC, X=CH2COOH in FIG. 11) are currently preferred. Also cellulose succinate, maleate, and other dicarboxylic acid esters are applicable. One glucose unit may contain 1-3 acidic or other substituents. One currently preferred method for the creating a good electrical contact is pyrolysis of CMC or another cellulose derivative (FIG. 11). Cellulose and its derivatives 1101 start to decompose at temperatures above about 260° C. Cellulose will decompose mainly into volatile small molecules. Although the chemical structure of the decomposition products of cellulose derivatives are not currently known, the electrical contact between HNTs 1102 and precursor nanoparticles 1103 will be improved. Precursor nanoparticle can be nanoparticle, such as carbon including graphene, titanium dioxide, lead dioxide, lead(II4I,IV)oxide, iron phosphate, tin dioxide, magnesium dioxide, cadmium sulfide. It can be a single ion, for example, copper(II), iron(II), iron(III), or lanthanum that serves as a nucleus for the growing nanoparticle. These are nonlimiting examples. The term precursor nanoparticle is used, because the particle can be so small that it not a nanoparticle in the strict sense of definition. During pyrolysis the precursor nanoparticle will be partially or totally coated with amorphous carbon. The chemical composition and structure of the pyrolysis product may depend strongly on the temperature of pyrolysis. We suppose that at higher temperatures, about 800° C., the product will resemble amorphous carbon 1104, and call the pyrolysis product amorphous carbon even, if the pyrolysis temperature is lower than 800° C. (FIG. 11). The result will also depend on heating method to some extent. Joule heating is fairly even. IR- or microwave heating may heat some components, CNTs and CNPs, very strongly, while having virtually no direct effect on cellulose or modified cellulose itself. However, the junction of CNT and CNP will be strongly heated, and vicinal cellulose will be pyrolyzed to provide a seal for the junction. We consider this process to be analogous to soldering. Instead of tin the soldering is performed by a decomposition product of CMC or some other functionalized cellulose. Before the pyrolysis, the CMC molecules can be connected with metal ions, such as copper, zinc, aluminum, or alike. Presence of metal ions will create cavities during pyrolysis. Acid treatment will form hydrogen bonds between CMC molecules. Additional advantage of the pyrolysis is that most of the cellulose backbone will decompose into small molecules that evaporate. Still the porosity is largely retained. Thus, the final weight of the product is reduced considerably, while quality is improved.

Another method for the connecting HNTs and electrically conducting nanoparticles, is to deposit nanoparticles directly on the surface of the HNTs. Especially, if the HNTs are dispersed using CMC, many metal ions bind with CMC that is tightly bound with HNT, and the nanoparticles can be fabricated directly onto the surface of HNTs. Currently cuprous iodide, magnetite, Prussian blue, tin oxide, and cobalt oxide nanoparticles are favored. For EMI protection also magnetite nanoparticles are advantageous. In these cases the precursor nanoparticle can be a single metal ion that is attached with functionalized cellulose or HNT. The nanoparticle will grow around this ion, when more reagents will be added.

Currently cellulose and its derivatives are used advantageously to disperse HNTs and in some cases also electromagnetically active nanoparticles. cellulose provides also porosity that is useful especially for supercapacitors.

Still another mixing method is provided by shear force that can be especially strong in a high pressure dispersion apparatus, which is commercially available, for example DeBEE 2000 Pilot Homogenizer. The pressure gradients in these devices can be hundreds of bars.

Mechanical mixing is ineffective at very short distances because the molecules move together about the same speed, although counterstroke mixer alleviates partly this problem. The ultrasonic vibration agitates molecules and particles by accelerating them back and forth in a rapid succession. Thus, the diffusion gradients of the reagents are diminished. This greatly increases the rate of the diffusion dependent collision and binding of particles.

The power of one sonotrode can be between 0.1 and 50 kW, most advantageously between 1 and 20 kW. When multiple sonotrodes are used, the power may vary with time so that interference pattern will change all the time. Thus, the whole reaction mixture can be more evenly agitated. Ultrasonic processes can be easily scaled up and optimized (Hielscher T., Ultrasonic production of nano-size dispersions and emulsions, ENS'05, Paris, France, 14-16 Dec. 2005).

Cellulose xanthate is used industrially for the fabrication of cellulose fibers. Cellulose acetate, phtalate, acrylate, and nitrate are also much better soluble into organic solvents than cellulose. Sulfonation, carboxylation, amination, and many other functionalizations increase the solubility of the CNTs into water several orders of magnitude. All these and other functionalized cellulose derivatives and CNTs can be used as additives in the context of the present invention. Often the primary hydroxyl group is easiest to functionalize (X in FIG. 11), although other hydroxyl groups can also be functionalized.

Currently Preferred Embodiment for the Fabrication of Modified Cellulose Fragment-Nanoparticle Gel The starting material for the method of this invention can be cellulose that is made from wood, grass, or any other plant material. Also bacterial cellulose, such as produced by *Acetobacter xylinum*, can be used. Because of low cost, one preferred starting material is the finely divided suspension that is not retained in paper during the fabrication of paper that also contains nanoparticles. Microcrystalline cellulose is another preferred starting material, because of consistent good quality.

Cellulose molecules consists of about 5 000 β-glucose moieties. Vicinal cellulose molecules are strongly hydrogen bonded, and separation of individual cellulose molecules is nearly impossible. Hydrolysis of β-glucoside bonds produces fragments that are easier to separate. Fragments should be long enough so that they are still interesting for the materials applications, i.e., they should form strong hydrogen bonded network and be slightly or sparingly soluble into water. Hydrolysis can be performed by chemical means, for example, catalyzed by acids, such as sulfuric or hydrochloric acids, or enzymatically. Also certain molecules or ions, including boric acid, aluminum, iron, zinc, magnesium, and calcium ions, will catalyze the hydrolysis. Cellulose is also thermally unstable above 260° C. Superheated steam above 260° C. will be able to cut cellulose molecules.

Separation of the cellulose fibers and cellulose fragments (fragmented cellulose) is essential for the fast reaction. Otherwise the product will inhibit the further reaction. Boric acid under basic conditions will assist the transfer of cellulose fragment. Chaotropic agents will also break hydrogen bonds that keep cellulose molecules and fibers together. One of the most powerful chaotropic agent is guanidinium isothicyanate. Ultrasonic vibration is one currently preferred method for the detachment of fragments from cellulose fibers. Temperature has also a significant effect on the breaking of hydrogen bonds.

Reactions rely on diffusion on a molecular scale. Mechanical mixing is ineffective at very short distances because the molecules move together about the same speed. The ultrasonic vibration agitates molecules and particles by accelerating them back and forth in a rapid succession. Thus, the diffusion gradients of the reagents are diminished. This greatly increases the rate of the diffusion dependent reactions. The separation of large molecules and nanoparticles benefits even more from the ultrasonic agitation. For example, diffusion of an enzyme is relatively slow, but ultrasonic vibration promotes the movement of an enzyme to and from the surface of a cellulose fiber. The cellulose fragment that is partly or totally detached from the cellulose fiber will have different acceleration in the same oscillating medium than the remaining aggregate. Thus, they are pulled apart. If the process relays on the diffusion alone, it would take much longer time. One aspect of the present invention is to use enzymes 701 that are conjugated with spacers, such as PEG, with nanoparticles 703 (FIG. 7). Conjugation of enzymes with nanoparticles is well known in the art. These kind of particles act simultaneously mechanically and biochemically.

Also purely chemical reaction, such as acid hydrolysis, can be accelerated by nanoparticles that loosen the structure of a cellulose fiber. This will further promote the chemical reaction and separation of components. Nanoparticles must be tolerant against the chemical milieu of the process. For example, hydoxyapatite nanoparticles tolerate basic conditions, and silica particles are resistant to acidic conditions. Earth alkali sulfates are suitable in the in the presence of sulfuric acid, because the excess of the sulfate ions prevents the dissolution of these particles. Some carbonates, such as calcium or barium carbonates, may be used especially, if the solution contains soluble carbonate, such as sodium carbonate.

Removal of the reaction product is not enough, if the product can diffuse back onto the cellulose fibers. Nanoparticles can assist the removal by bonding the cellulose fragments. Also CNTs will be coated by cellulose fragments. Binding of cellulose fragments by particles is advantageous for the hydrolysis of cellulose, but also fragments can be further hydrolyzed. In order to prevent further fragmentation of primary cellulose fragments flow through reactor is currently preferred (FIG. 6).

In the simplest form the flow reactor has outer and inner tube. A part of the inner tube is tubular grid that has mesh size between 200 and 2000. A thick slurry of cellulose starting material that contains catalytic agent, such as acid, enzyme, or microbe, and nanoparticles flows downward. Water that might contain nanoparticles or CNTs flows upward in the outer tube. The content is agitated, preferably by ultrasonic vibration. Cellulose fragments will be transferred from inner tube into the outer tube. Catalytic agent may be bound onto a solid substrate so that it is retained inside the inner tube. For example, an enzyme may be bound by a spacer onto a relatively large particle, or ion exchange resin may be used to carry protons or catalytic metal ions. In order to facilitate the transfer the product through the grid, the pressure between the two tubes may oscillate so that there is back and forth flow between the inner and outer tube. Oscillation can be accomplished by coordination of pumps or valves that are part of the system. In an alternative embodiment cellulose and CNTs are mixed mechanically, and the mixture is suspended into water, and flows in the inner tubular grid. It is obvious that the role of inner and outer tube may be reversed, and also any combination of flow directions will be applicable.

Flow reactor that has more throughput is depicted in FIG. 6. It has 14 tubular grids. The star ting material is pumped into one tube that is divided into 14 tubes, and after passing the grids inside the reaction chamber these tubes are connected into one tube again.

Although the continuous reactor (FIG. 6) is currently preferred, it is obvious that the ultrasonic method of this invention is applicable also in bath type reactors. The ultrasonic vibration is more efficient at higher pressures. The pressure can be increased in continuous reactors by hydrostatic pressure. About 10 m high column of water based liquid in a tube or pipe corresponds to one bar (megapascal) of pressure. The pressure can between 1 and 50 bar and most advantageously between 2 and 5 bars. Excessively long tubular reactor can be avoided, if the reactor is closed and pumps are used.

The ultrasonic vibrator generates heat, and the temperature can actually increase slightly in the reactor. External or internal heating is also possible in the reactor. The heating can be accomplished by the methods that are well known in the art. Also electromagnetic radiation can be used, especially IR-, or microwave radiation. The wavelength is preferably chosen so that cellulose, nanoparticles, or CNTs absorb it effectively. This radiation may be advantageously directed into the reaction chamber.

The reactor may contain a mechanical mixer. The mixer may have blades, propel, or screw. The motor is advantageously outside the reactor and on the top, and the shaft comes into the reactor. Mechanical mixing can be used with or without ultrasonic vibration.

While cellulose molecules are strongly hydrogen bonded within one cellulose fiber, the interaction of molecules between two fibers is much weaker, i.e., the structure is granular. On the contrary, when solid material is reconstructed from individual cellulose fragment molecules, they can form continuous 3D network, in which vicinal molecules will be strongly hydrogen bonded, and essentially a continuous, isotropic material will be formed. Although some molecules bind parallel with each other, no significant fibrous structure is formed. The material is amorphous gel-like. This is clear distinction with nano-, and microfibrillated cellulose, and, of course, with cellulose itself. Very strong paper, boards, and other pieces that have more complicated shapes can be produced from cellulose fragment gel. Nanoclay, and other micro- or nanoparticles, including but not limited to silica, alumina, magnetite, titanium dioxide or silicate, cadmium sulfide, Prussian blue, CNTs, carbon, and graphene, can be mixed with fragmented cellulose mass advantageously during fragmentation. Mixing of particles and cellulose fragments can also be done before the fabrication solid objects. These particles can give desired additional properties, such as increased modulus, color, magnetic or electric properties. The product is Celose™ in all cases. If it contains CNTs, for example, it can specified as CNT-Celose™.

If only ESD is required, mixing of 0.1-2% of CNTs will be sufficient. Good EMI protection is obtained if the material contains about 10-40% of CNTs. Because CNTs reflect microwave radiation, addition of carbon nanoparticles is advantageous so that the microwave radiation is mostly absorbed. Magnetic protection will require 1-20% of ferrite particles. Ferrite particle can be quite large, up to 50 um, and they may be coated with silica or alumina layer. Material that is used for heating elements should have specific resistance around 1 Ωcm, which is obtained, when the CNT content is 10-30%. Supercapacitors are advantageously made of CNT-cellulose nanocomposite that contains 20-70% of CNTs. Conducting ink for printable electronics should contain 20-70% of CNTs. Product that contains 70% of CNTs and 30% cellulose (molecular fragments) is still paper-like and can be easily handled and formatted into various shapes. However, the good properties of CNT-cellulose nanocomposite do not increase linearly with CNT content. Instead it seems that capacitance and EMI protection reach optimum around 50% of CNTs.

While fragmented cellulose is advantageous for the dispersion of nanoparticles and CNTs, part of it or all of it can be removed after dispersion process. For example, the weight of supercapacitors should be minimized, and cellulose or cellulose fragments do not have active role in the electric storage function. The excess cellulose can be removed by further fragmentation so that the fragments become soluble, and can be washed away, or are transformed into carbon that is actually active in the supercapacitor (FIG. 2 F to D, or E to C). In the extreme case the thermal fragmentation can go so far that fragments will evaporate. Enzymatic fragmentation is very gentle, and will retain the overall structure of the CNT network so that the collapse is avoided. The voids that will be created by enzymatic treatment can be filled with nanoparticles that can be deposited using soluble components, or with the premade nanoparticles. These nanoparticles should be electrically active in supercapacitor function. Nonlimiting examples include iron phosphate, magnetite, Prussian Blue, cadmium sulfide, lanthanum fluoride, cobalt oxide, tin oxide, titanium oxide, or lithium titanate. Cobalt oxide is very convenient, because it can be electrochemically deposited that guarantees that the deposition happens on the surface of CNTs.

Paper or formatted pieces can be compressed under pressure, between 2 and 100 bar, in order to make pieces thinner and harder. Heating will further assist compactification.

Functionalization

In some cases the starting material may be functionalized, for example, it can be carboxymethyl cellulose, acetyl cellulose, nitrocellulose, glycidyl cellulose, hydroxyethyl cellulose, or PEG-cellulose. Degree of functionalization is especially important for the microbial or enzymatic hydrolysis. High degree of functionalization may prevent hydrolysis. On the other hand optimal functionalization will allow limited hydrolysis so that long fragments will be obtained that are resistant to further hydrolysis.

Cellulose fragment can be functionalized by any method known in-the-art after they have been fabricated. Because they are more easily detached from other fragments than cellulose molecules from cellulose fibers, functionalization of fragments is often relatively straightforward. Especially the interaction with solid particles, such as nanoparticles and CNTs is fast and might require minimal amount of solvent, such as water.

Cellulose fragment can bind nanoparticles with covalent, ion, coordination, or hydrogen bond (FIG. 5). Hydroxyl groups bind with many metal ions with coordination bonds. Nonlimiting examples are aluminum, magnesium, calcium, and titanium ions. Large number of bonds makes the interaction very strong. This has important implications for the fabrication of high modulus materials. Silica and alumina form hydrogen bonds with cellulose fragments. Carboxymethyl functionalized cellulose fragments will form ion bonds with metal ions, and metal ion containing particles. Strong bond is formed with aluminum, copper, zinc, and tin ions. These are nonlimiting examples. Covalent bonds require a chemical coupling reaction, for example, amide bond formation between amino functionalized CNT and carboxymethyl functionalized cellulose fragment using carbodi-imide as a coupling reagent. Glycidyl cellulose fragments will bind spontaneously with amino groups.

Supercapacitors

The capacitance is $$C = \frac{Q}{V} = \frac{A\varepsilon}{d}$$

where Q is the charge, V is the potential, $\varepsilon = \varepsilon_0 \varepsilon_r$, in which $\varepsilon_0$ is the permittivity of empty space and $\varepsilon_r$ of the medium and d is the thickness of the electric double layer, which is about 0.3 nm almost independently of the materials involved. Dielectric constant (permittivity) of solution is dictated by the solvent that is water or some other polar solvent in electrolyte capacitors. In the table 1 are some solvents and their dielectric constants.

TABLE 1

Permittivities of some solvents that can be used in supercapacitors of the present invention.

| Liquid | Permittivity |
| --- | --- |
| Methanol | 33 |
| Acetonitrile | 36 |
| Glycerol | 47 |
| Water | 80 |
| Ethylene carbonate | 90 |
| Formamide | 111 |

TABLE 1-continued

Permittivities of some solvents that can be used in supercapacitors of the present invention.

| Liquid | Permittivity |
| --- | --- |
| N-methylacetamide | 179 |
| N-methylformamide | 189 |

Electrolytes dissolve also better into the solvents that have high permittivity. Solvents should be electrochemically as inert as possible. Water is perhaps most reactive solvent that is listed in Table 1. In organic solvents tetramethylammonium tetrafluoroborate or an ionic liquid can be used as an electrolyte.

The electrically conducting surface area is linearly correlated with the capacitance. One way to further increase the active surface area is to adsorb or couple conducting particles 902 with the HNTs 901 (FIG. 9). Spherical particle has a fourfold area compared to the area 903 that it covers. Moreover, most of the covered area is still active. In the ideal case the active area can be increased fivefold. This increase is independent of the radius of the particles. Thus, it is advantageous to use as small nanoparticles as possible, because overall mass and volume will increase minimally. Porosity or roughness of the particle 902 will increase the area even more.

The conductivity of the nanoparticles is not of prime concern. Because cellulose-HNT network conducts electricity well, the nanoparticles that are in contact with HNTs will be charged even, if they are poor electrical conductors. Nanoparticles should be resistant to corrosion under electrical potential. Nanoparticle 1001 may be coated with a thin layer 1002 that is chemically and physically very stable (FIG. 10). Example is coating of magnetite, or Prussian Blue particle with iron phosphate, plumbate, or silicate, or cobalt oxide with cobalt phosphate. Coating may be dielectric, if it is very thin, almost atomic layer, but will still increase stability. Thin phosphate coating may be done by dipping CNT-cellulose-nanoparticle nanocomposite into dilute phosphoric acid or sodium phosphate solution.

In addition of the surface area the capacitance depends on the ratio zr/d. Because in water the distance of ions from the surface of HNTs is about 0.3 nm, this ratio is about 267 (=80/0.3). If HNTs are coated with a 3 nm layer that has $\in_r>800$, the capacitance will increase. One such material is barium titanate that has $\in_r\sim10\,000$. The capacitance will increase 12-fold in ideal case. Because of defects in the coating, the increase in the capacitance will be less, for example, 4-fold. HNTs are now coated with electrically insulating layer, and potential of the HNTs can be increased many fold, up to 3-fold, without electrolysis of water. Total charge will be 12-fold as compared the same system without any coating of HNTs. Power density in this example will be 36-fold (3×12). In general the energy of a capacitor is:

$$W = \frac{1}{2}\frac{Q^2}{C} = \frac{1}{2}CV^2$$

Because continuous coating with a highly porarizable dielectric can increase both capacitance (Q and potential (V), the increase in the stored energy can be very large.

The present invention provides one additional advantage over conventional supercapacitors. Traditionally only a thin layer of active material, such as carbon black is compressed onto an electrode, such as aluminum foil. Because HNT network is fairly well conducting, much thicker electroactive layers can be used. This is especially true, when the contact between HNTs has been improved, for example, by partial graphene connectors (FIG. 16).

CNT-cellulose-nanoparticle layers can be dried so that they are easy to handle. Thickness of the layers can be between 1 μm and 1 cm, advantageously between 0.1 mm and 1 mm. Pulp-like mass can be deposited directly onto a grid that can be made, for example, of copper. Grid can be coated with a thin layer of gold or platinum. This process resembles the conventional papermaking. In this case the composite layer and grid will not be separated. Alternatively the grid can be made of plastic. Then the grid is separated and replaced with a copper grid. The latter method is preferred, because the holes in the grid can be much bigger, i.e., the mesh number can be smaller. Currently, the mesh number about four is preferred. Layers will be stacked and the grids will be electrically connected with each other within a stack. The stack will be connected also with one electrode. Two stacks will be placed into a container so that they will be separated with a semipermeable membrane. When copper grid is used, the liquid is preferably an organic solvent. Grid can also be made of some other material, such as aluminum, stainless steel, chromium, copper, silver, or graphite. It can be also coated so that it is not corroded on water. Coating material can be, for example, gold, platinum, polyaniline, polythiophene, or silver or HNT containing epoxy. There is virtually no size limit for this kind of supercapacitor. Instead of stacking of layers, the HNT-cellulose nanoparticle composite can be rolled with the grid into a cylinder. Other constructions are equally possible.

In many applications it is preferable to have a capacitor that is essentially one piece (FIG. 15). This can be accomplished, if the semipermeable membrane 1503 is made of cellulose, or modified cellulose. Very wide range of cellulose derivatives may be used. First, paper of CNT-cellulose fragment gel is fabricated, but dried only partially. On top of this CNT containing paper 1502 is fabricated a layer of non-conducting paper 1503, and the two-layer paper will be partially dried. CNT-cellulose fragment gel is added on top of the non-conducting paper so that a seamless structure (FIG. 15) will be obtained.

Especially, when supercapacitor is one piece, it is desirable that the electrolyte is solid. Electrolyte can be ionic liquid, such as methyl ethyl imidazole tetrafluoroborate, absorbed into polymer that can be cellulose or some other polymer. Electrolyte can be also be any commonly used salt in polyethylene glycol (PEG) or poly(ethylene carbonate). These kinds of supercapacitors can be printed, and in any case they require minimal casing.

In another analogous embodiment a three-layered hard board will be fabricated, two CNT-cellulose fragment gel layers on both sides and cellulose or modified cellulose layer in the middle. Hard boards are manufactured by compressing pulp between one grid and plate or two grids using high pressure, between 2 and 40 bar. Aluminum foils or other similar electrodes will optionally be glued on both sides so that electrical contact is created. Electrodes may be in several layers inside the hard board. If water is used as a solvent for electrolyte, then graphite electrodes, such as graphite fiber, will be preferred.

An alternative embodiment does not have semipermeable membrane, but instead has ion selective membrane. The ion selective membrane will allow noncompatible electrolytes in anodic and cathodic compartments. Examples are sodium sulfate or potassium phosphate in anodic compartment, and magnesium or calsium chloride in cathodic compartment. If semipermeable membrane is used in these cases, a precipitate would be formed and the supercapacitor would be clogged.

Still another advantage of the ion selective membrane is that electrochemically active ions or particles can be more advantageously used. For example, magnetite, lead(II4I,IV) oxide, Prussian blue, or cuprous iodide can all be oxidized and reduced. Nickel and cobalt analogues of magnetite and Prussian blue can be equally well be used. Prussian Blue contains both ferro (ironII) and ferri (ironIII) ions, and can be oxidized or reduced. Some metal ions can be both oxidized and reduced. These include Cr3*, and Mn4*. In general, particles that can be oxidized or reduced are applicable within the scope of this invention. These particles add both capacitance and pseudocapacitance that is electrochemical process. Using these kind of particles will increase the capacitance more than Eq. 1 implies, because of the space charge also volume of the particle is important.

The electrochemical products would gradually diffuse through a semipermeable membrane and the supercapacitor would be discharged. The ion selective membrane retains the electroactive species in their compartments. In addition to the actual capacitance, these electroactive species contribute to so called pseudocapacitance that is very efficient way to increase the apparent capacitance. While conventional capacitance relays on the surface charge, the pseudocapacitance utilizes space charge, i.e., particles are charged also inside. Because this process requires only movement of electrons inside the particles, and particles are not consumed, unlike the electrodes in batteries, the lifetime of the supercapacitor can still be very long. In other words, there is no material removal and consequent reassembly of electrodes as is the case in batteries. In FIG. 12 is a TEM image of CNT-cellulose-Prussian Blue material. The sample was dispersed into water by ultrasonic vibration. TEM grid was dipped into a very dilute dispersion. TEM grid had holes that appear as light large oval shapes in FIG. 12. CNTs 1202 and Prussian Blue nanoparticles 1201 are clearly visible. While most nanopartieles are attached with CNTs, the ultrasonic vibration separated some nanoparticles from CNTs.

Ion selective membranes can be made of many materials including ion exchange plastics, glass, ceramics, such as zeolites. Superionic conductors are one currently one preferred class of materials for ion selective membranes. Polyethylene glycol is sodium and lithium ion conductor. Many ion selective membranes have ion exchange properties, and in addition well defined very small pore size. Zeolites are a prime example of such materials.

Graphene is one currently preferred nanomaterial for the increasing the surface area, and connecting HNTs 1600 and 1601 electrically FIG. 16. Cellulose 1602 will also separate graphene sheets 1604 from each other so that flat sheets do not collapse back together. Another method to prevent collapse of graphene sheets is to coat them with nanoparticles 1603, such as silica, alumina, carbon, gold, silver, chromium, cadmium sulfide, tin oxide, magnetite, Prussian blue, lithium titanate, lanthanide fluoride, or iron phosphate that will act as spacers. Advantageously, these nanoparticles are also electrically conducting so that their surface will contribute also to supercapacitor function. If they are electrochemically active they act as pseudocapacitors.

Continuous Coating of CNTs

Eq. 1 implies that increase of the dielectric constant will increase the capacitance linearly. Dielectric constant can be increased by proper choice of solvent, and also by some high dielectric constant coating. While the choice of a solvent is well known in-the-art, the coating is a subject of the present invention.

In one currently preferred embodiment CNTs are first suspended into water using either CMC, or cellulose fragment gel. Water is replaced by 2-propanol. A mixture of barium i-propoxide and titanium i-propoxide in 2-propanol is added. When potassium hydroxide water solution is added barium titanate is formed. Polarity may be affected by applying electrical potential during the deposition. Preprepared barium titanate nanoparticles may be added before the deposition of barium titanate from alcoholates so that these barium titanate nanoparticles will be glued by in situ deposited barium titanate with CNTs. Chemical vapor deposition (CVD) or atomic layer deposition (ALD) provide good quality layers. Especially ALD allows atomic precision in growing of the coating layer. These methods are well known in the art.

Although the distance of ions from CNT (d in Eq. 1) will increase, the dielectric constant will increase much more, and capacitance will be much bigger, for instance 10 times bigger. The increased surface charge density will increase conductivity. Thus, during charging the conductivity should increase, and no additional electrodes will be needed. In supercapacitors the density of electrons (in cathode) or holes (in anode) increases and electric wire having supercapacitor structure can be fabricated. Conductivity can increase substantially, if the temperature is lowered so that electrons form Cooper pairs.

EMI Protection

Structures that provide electromagnetic shield can be made from CNT-cellulose-MP materials. The electromagnetic noise will penetrate poorly through most CNT-cellulose-MP materials.

HNT-cellulose-nanoparticle material may additionally contain magnetic or paramagnetic particles for ideal EMI protection. Paramagnetic particles are advantageously ferrite particles, for example magnetite particles. Particle size can be between 5 nm and 50 urn. Particle concentration should be advantageously such that percolation threshold will be exceeded. Magnetic particles and paramagnetic particles are simply called magnetic particles in this disclosure, and denoted as MP.

CNT(1701)-cellulose (1702) composite and magnetic particles (1703) can be in the same layer 1704 (FIG. 17 A), or in separate layers 1705 and 1706 (FIG. 17 B). MPs are advantageously coated with silica or aluminum oxide layer (See FIG. 10). This is accomplished by dipping into tetraethyl silicate or aluminum isopropoxide solution, for example in 2-propanol.

Currently dual layer structure is preferred for EMI protection, mainly because the density of electrically and magnetically active particles can be higher than in one layer containing both. It must be noted that dual layer structure can contain layers, which contain both CNTs and magnetic particles. In this case one layer contains more CNTs and the other more magnetic particles.

Triple layer structure is even more efficient than single layer or dual layer. In this structure electrically conducting layers are outside, and magnetically active particles or even an inert layer is in the middle. Triple layer is several orders more effective even, if the total amount of active materials is the same as in the single layer structure. The efficacy is partially due to multiple reflections between layers so that interference destroys most of the incoming electromagnetic radiation. Another reason for the increased efficacy is that the node of the radiation can not be coincident with both layers simultaneously.

When paramagnetic particles are deposited on solid surface, for example, by spraying, a magnetic field can be applied. The first magnetic field is advantageously parallel with the surface. Another layer may be deposited so that the second magnetic field is still parallel with the surface, but perpendicular to the direction of the first magnetic field. If multiple layers (FIG. 18) will be deposited the magnetic field direction can be different every time. Single layer structures can be fabricated so that MPs are mixed simultaneously with cellulose and CNTs, or they are added afterwards. They can be added as premade particles, or synthesized in situ. In dual layer structures the MP layer can be fabricated with known methods. Also then cellulose and functionalized cellulose can be used as binding agents.

In most applications the EMI protective paper will be impregnated with plastic, such as polypropylene, polyacrylate, or polycarbonate or resin, such as epoxy or polyurethane. Plastic prevents the release of CNTs in consumer products. It also helps the attachment of shield into an electronic device by hot pressing, gluing or by some other commonly used dealing method.

Applications are plentiful, including all electronics, including computers, mobile devices, wireless link stations, electric motors, and electrical wires.

Further Processing

Paper and paper-like products can be fabricated with the same methods that conventional paper is fabricated. CNT-molecular cellulose-nanoparticle nanocomposite is a gel in water, and retains water very well. Water must largely be removed during the fabrication of paper. Coagulants, such as copolymer of acrylic amide and acrylic acid or other well known coagulants, can be used. These materials can also be used instead of cellulose to wrap graphitic materials according to this invention. We have found that freezing of the gel before paper fabrication will decrease the filtration time considerably. Thus, the fabrication of paper either in sheet format or roll format can be done by conventional methods. Supercapacitors and EMI protection materials can be layered structures. These can also be made by modified methods, in which the first layer is filtered so that most of the water is removed, and on top of the first layer is added a second layer, and so on. Various layers form one continuous paper-like structure, in which the layers are firmly connected with each other.

Especially a three-layer structure can be formed by coating a premade paper or plastic on both sides with a CNT-molecular cellulose-nanoparticle nanocomposite gel or ink. All kinds of surfaces and shapes can be coated with wet material. After drying the surface is partially or totally covered with cellulose-HNT material.

The materials of the present invention can be mixed with other composite or hybride materials. These include thermoplastics, resins, ceramic, and even metals.

HNT-cellulose and HNT-cellulose-MP materials can be mixed with melted thermoplastics or with monomers that will be polymerized after the mixing, cellulose, HNTs, or both can be functioilalized so that they will bind chemically with the matrix. For instance, cellulose acrylate may be mixed with the acrylate monomer. HNTs may be added into this mixture, and the mixture is polymerized. In this case there is no need for prefabrication of HNT-cellulose nanocomposite. Also HNTs may be functionalized with acrylates in this specific example. Similarly, cellulose-HNT can be incorporated in polycarbonate, silicone, nylon, Kevlar, polystyrene, polyethylene, polypropylene, and polyvinylchloride.

Carboxymethyl cellulose (CMC) is currently preferred with MPs. Carboxylates bind strongly with MPs, and will disperse them. Additional ferro, fern, copper, tin, aluminum, or several other salts will cross-link CMC, and create strong structure.

In one currently preferred method a concentrated mixture of the HNTs and cellulose acetate propionate (CAP) is fabricated first, and this mixture is then mixed with a thermoplastic. The advantage of this process is that CAP can be melted without decomposition, and no solvent is required in the fabrication process. Once HNTs are dispersed into the CAP, they can be easily mixed with the thermoplastic. The HNT-CAP and thermoplastic can be mixed as powders and heated so that both of them will be melted. The good mechanical mixing is sufficient for the dispersion of HNT-CAP into the thermoplastic, although optionally ultrasonic vibration may be used.

CAP may be partially hydrolyzed with a base, so that some or all of the hydroxy 1 groups of cellulose are released. The purpose of this hydrolysis is to make the composite more polar or hydrophilic, and also more porous. This can be important in some applications, such as capacitors, in which ions must be able to move.

If covalent coupling with the matrix is not essential, the mixing of the cellulose-HNT with a polymer melt is preferred over copolymerization. In several cases mixing is easier, if proper cellulose derivative is used. Often cellulose acetate is preferred. For polystyrene, cellulose benzoate is adequate, while for polypropylene cellulose butyrate or palmitate is a better fit.

Thermoset plastics and resins are typically fabricated from two components, which are mixed shortly before the use. Cellulose, HNTs and MPs can be mixed with one of these components or both. For example, cellulose glycidyl ether-HNT nanocomposite may be mixed with bisphenol A bisglycidyl ether. When this epoxy is mixed with a hardener before the use, HNT-cellulose nanocomposite is chemically coupled with the epoxy matrix via cellulose. Coupling may be assisted by addition of alumina nanoparticles into HNT-cellulose-nanoparticle nanocomposite. Other alternative is to soak nanocomposite into aluminum i-propoxide solution in i-propanol. Aluminum ion will catalyze the reaction between hydroxyl groups and epoxy groups leading into a covalent linkage between epoxy matrix and cellulose and similarly between epoxy matrix and HNTs. If HNTs are functionalized with epoxy groups, also HNTs and cellulose will be chemically coupled. Similarly, HNT-cellulose may be mixed with urethanes. The hydroxyl groups of cellulose react with isocyanate groups, and cellulose serves as a hardener. Other resins include phenol-formaldehyde, in which can represent phenol-formaldehyde resin. HNT-cellulose-nanoparticle paper can be used to reinforce plastics and resins similarly as glass or carbon fiber. Because CNT or HNT content can be very high the effect will be significant.

Many ceramics can be fabricated by mixing the components first in water. Also water-alcohol mixtures can be used. These are suitable for the mixing of cellulose and CNTs.

Thus, all components can be mixed simultaneously. For example, compounds like calcium hydroxide, aluminum hydroxide, copper chloride, and iron chloride can be mixed with cellulose-NT slurry, and sodium hydroxide can be added, when applicable. The mixture is heated at about 110° C., dried, and calcinated at relatively low temperature of about 250° C. under nitrogen. If silicic acid is added, glass-like product will be obtained. If pyrolysis of cellulose backbone is desired, the temperature can be much higher, up to 800° C.

Sol-gel method is amenable for the fabrication of HNT-cellulose nanocomposites. This method is closely related to the fabrication of ceramics. In the sol-gel method the solvent is preferably alcohol, and additional gel forming component, such as tetraethyl silicate, is part of the mixture. When small amount of water is added, tetraethyl silicate is hydrolyzed, and silica gel is formed. Silicon atom may be connected with one or two alkyl or aryl groups like methyl, or phenyl groups, which may also have functional groups, such as hydroxyl, amino, or carboxylic groups. Metal alcoholates are hydrolyzed by water into metal hydroxides, which often transform into corresponding oxides either spontaneously, or after heating. In order to neutralize the hydroxide ions, the water may contain acid, such as hydrochloric, hydrobromic, nitric, perchloric, sulfuric, formic, trifluoroacetic, or an easily hydrolysable ester like methyl formate. If the water phase contains anions, such as halogenides, sulfide, selenide, telluride, carbonate, sulfate, phosphate, arsenide, and oxalate a corresponding salt is formed. The solution may contain several different alcoholates, and tetramethoxy or tetraethoxy silicate. Either composite nanoparticle, or metal silicate nanoparticles are formed in this case. Typical metal alcoholates or related compounds include barium(II)isopropoxide, zinc(II)methoxy ethoxide, aluminum(III)isopropoxide, iron(III)isopropoxide, nickel(II)methoxy-ethoxide, holmium(III)iso-propoxide, yttrium(III)iso-propoxide, europium(III)-D-3-trifluoro-acetylcamphorate, tin(IV)isopropoxide, titanium(IV)isopropoxide, titanium(IV)iso-butoxide, tungsten(V)ethoxide, tungsten(VI)isopropoxide, bismuth(III)methoxy-2-methyl-2-propoxide, hafnium(IV)tert-butoxide, hafnium tri-isopropoxy tetramethyheptane-dionate, zirconium(IV)tert-butoxide, niobium(V)iso-propoxide, vanadium(V)tri-isopropoxide oxide, aluminium cobalt isopropoxide, lead(II)titanium(IV) isopropoxide, lead zirconium ethylhexano-isopropoxide, and SrTa2(OEt)io(dmae)2. Almost any ceramic nanocomposite can be prepared using alcoholates. Examples are lead zirconium titanate, barium titanate, and strontium bismuth thallium oxide containing nanocomposites, which are piezo electric materials, and yttrium barium copper oxide that is a high temperature superconducting material. Barium titanate has very high dielectric constant, and is useful in supercapacitors. Barium and strontium titanates are examples of ferroelectric materials. Another example is potassium tantalum niobate.

Silylamides are another class of soluble metal compounds that are hydrolyzed by water. These include tris[N JSf-bis (trimethylsilyl)amide]-cerium(III), and analogous compounds of erbium(III), europium(III), gadolinium(III), holmium(III), lanthanum(III), lutenium(III), neodium(III), praseodymium(III), samarium(III), scandium(III), terbium (III), thulium(III), ytterbium(III), and yttrium(III). These metal cations are lanthanides, and form fluorescent nanocomposites. Some other metals can be coprecipitated in order to change absorption or emission properties, or simply to reduce the cost.

Cellulose-HNT aerogels are made from the compounds mentioned above by replacing alcohol with supercritical carbon dioxide, and slowly evaporating carbon dioxide.

Thermal instability of cellulose prevents the incorporation of HNT-cellulose into any metal that has melting point above 260° C. However, there are other methods that are applicable. These include compression of nano- or micro-powders, electrochemical deposition of metals, and flash cooling of evaporated metals so that amorphous metals are formed around HNT-cellulose at a low temperature. Again, if pyrolysis is desired, it can be performed before mixing the HNT-amorphous carbon-nanoparticle nanocomposite with metal. Then the temperature limit can be much higher, up to 800° C. The pyrolysis can also be combined with mixing the cellulose-HNT-nanoparticle-nanocomposite with hot metal.

EXPERIMENTAL DETAILS

While this invention has been described in detail with reference to certain examples and illustrations of the invention, it should be appreciated that the present invention is not limited to the precise examples. Rather, in view of the present disclosure, many modifications and variations would present themselves to those skilled in the art without departing from the scope and spirit of this invention. The examples provided are set forth to aid in an understanding of the invention but are not intended to, and should not be construed to limit in any way the present invention.

In all examples starting materials, and the produced nanocomposites are slightly or sparingly soluble in the solvent that is used.

Example 1

One gram of CNTs, and two gram of cellulose, two grams of calcium carbonate nanoparticles were suspended into 100 ml of 0.2% CMC solution in water by using 400 W ultrasonic vibration 1 h. Similarly, one gram of CNPs were dissolved into 100 ml of 0.2% of CMC solution. These two dispersions were mixed, and the mixture was further sonicated 1 h. The mixture was made slightly acidic by 2 M hydrochloric acid. Paper sheet was fabricated by conventional paper making process, so that the thickness of the paper was about 150 um after compression. Paper was heated between a stainless steel grid and a glass plate 2 h at 280° C. The weight loss was 36%. The specific resistance of the paper was 0.6 Qcm, and specific capacitance 212 F/g.

When the heating was done in a microwave oven the specific capacitance was 112 F/g.

Example 2

One gram of enzymatically fragmented cellulose, and one gram of calcium carbonate nanoparticles were suspended into 50 ml of 2-propanol, and 500 mg of HNTs were added. The mixture was sonicated 60 minutes with tip sonicator, power 400 W. Paper was prepared by conventional methods. After drying the paper was dipped into 0.5 M CuCl2 solution. After drying the paper was dipped into 0.5 M KI solution, and immediately into methanol in order to remove iodine. This paper had specific capacitance 260 F/g.

Example 3

Two grams of cellulose fragment gel, two grams of calcium carbonate, and one gram of CNTs were suspended into 50 ml of water using ultrasonic vibration (500 W, one hour). The mixture was filtered. A specific capacitance of this material was 90 F/g.

Example 4

Two grams of microcrystalline cellulose, two grams calcium carbonate nanoparticles and one gram of CNTs and hundred milligrams of amorphous carbon nanoparticles were suspended into 50 ml of water using ultrasonic vibration (500 W, one hour). The mixture was filtered. A specific capacitance of this material was 97 F/g. When the microcry stall ine cellulose was partially pyrolyzed at 300° C., the specific capacitance increased to 115 F/g.

Example 5

Instead of pyrolysis of cellulose, calcium carbonate was removed by addition of 2 M HCl on the paper that was prepared by filtration. Paper was washed neutral by water. Into the paper was added 0.5 M CuCl2 solution and 0.5 M KI solution. The mixture was filtered and washed with methanol. The specific capacitance of this material was 265 F/g.

Example 6

Two grams of cellulose fragment gel and one gram of CNTs and hundred milligrams of amorphous carbon nanoparticles and hundred milligrams of graphene were suspended into 50 ml of water using ultrasonic vibration (500 W, one hour). The mixture was filtered. A specific capacitance of this material was 272 F/g.

Example 7

3 g of mechanically and enzymatically processed molecular cellulose that is coordinated with 3 g calcium of carbonate nanoparticles is first dispersed into 200 ml of water. Carbon nanotubes are treated with HCl in order to make the dispersion process easier. The treatment removes unwanted residues from the manufacturing process. First 100 grams of carbon nanotubes are put in a closed container. Then 300 ml of HCl is added on top of the carbon nanotubes. The container is then shaken and let stand for 2 hours. After this the carbon nanotubes are washed with distilled water until their pH is neutral. Washed tubes are dried in oven at 120 degrees of Celsius for over night. After drying they are mechanically ground using planetary mill.

200 ml of the molecular cellulose pulp and calcium carbonate dispersion is mixed with 1.3 grams of dry carbon nanotubes in a beaker. The mixture has now 30% weight/weight carbon nanotubes. The mixture is stirred shortly with spoon and then the mixture is treated with tip ultra-sonicator. Sonication time is 10 minutes at power of 750 watts. The dispersion is treated with HCl to remove inorganic salts. HCl is added until calcium carbonate is solubilized, and no carbon dioxide evolution is observed. After this the mass is washed with distilled water until the filtrate is neutral.

Desired amount of pulp is filtered through metal mesh or plastic netting sieve. Quite often 80 g/mA2 square weight is preferred. Two pieces of filter paper are put on top of filtered paper. Paper is then pressed with heavy rolling pin until it is detached from the mesh. The sample paper is now put between four filter papers and further pressed with hydraulic press while heating at 90° C. After this sample is dried in paper dryer for 2 hrs. EMI shielding efficacy of the paper was 25-30 dB.

Example 8

Procedure of example 7 was repeated expect that double walled carbon nanotubes were used instead of MWNTs. EMI shielding efficacy was measured by self constructed ASTM coaxial EMI SE tester and Anritsu 37369D VNA. Results are displayed in FIG. 19.

Example 9

Carbon nanotubes (1 g Baytubes, Bayer, Germany), 1 g microcrystalline cellulose, 0.2 g cellulose, 1 g of calcium carbonate, and carboxymethyl cellulose (0.2 g) were dispersed into 100 ml of water using ultrasonic vibration. Onto this solution was added ferric chloride and sodium sulfite solution. After careful mixing, ammonia solution was added.

The CNT-cellulose-magnetite nanocomposite was separated with a permanent magnet. Soluble salts were removed by washing with water, and finally with alcohol. The alcohol suspension was mixed with reactive diluent. The nanocomposite was mixed with digiycidylether of bisphenol A (100 g). Tall oil based hardener (30 g, Arizona Chemicals Inc.) was added, and mixed well. After curing the epoxy resin was electrically conductive (25 Qm) and paramagnetic.

Example 10

One gram of HCl treated carbon nanotubes and 1 gram of microcrystalline cellulose is first ground dry in mortar. Then 200 ml of purified water is added and sample is sonicated with 750 W sonicator 30 minutes. From this sample 20 ml is taken to be mixed with 400 mg of fibrous cellulose.

This fibrous cellulose is first prepared as following. Starting point is as received cellulose sheet from the pulp factory. The cellulose is shredded dry into even sized small pieces and put in beaker with 200 ml of water. First the pulp is vigorously mixed with magnet stirrer for 12 hrs and then sonicated while mixed at 750 W for 30 minutes.

A mixture of carbon nanotubes, microcrystalline cellulose and fibrous cellulose is sonicated at 750 W power for 30 minutes. Paper sheets are then prepared. Resistance of 80 g/m2 paper is less than 10 ohms with two point measurement and less than 1 ohm with 4 point measurement. Shielding efficiency of such paper was 25 dB at 10 GHz.

Additional modifications and advantages will readily occur to those skilled in the art. Therefore the invention in its broader aspects is not limited to the specific details, and representative materials and devices shown and described. Accordingly, various modifications may be made without departing from the spirit and scope of the general inventive concept as described in the disclosure and defined by the claims and their equivalents.

The invention claimed is:

1. A method for the fabrication of a nanocomposite from a graphitic material and a cellulosic material, the method comprising:
   providing the graphitic material;
   providing the cellulosic material;
   providing a liquid;
   adding hemicellulose to the liquid;
   adding nanoparticles, microparticles, or both to the liquid;
   mixing the graphitic material and the cellulosic material in the liquid at an ambient temperature; and
   a power source providing kinetic energy into the mixture, the kinetic energy and nanoparticles, microparticles, or both separating of molecular components from the graphitic material and the cellulosic material so that the said nanocomposite is formed and deposited.

2. A method of claim 1, the nanoparticles and microparticles each having a density that is at least twice a density of the liquid.

3. A method of claim 2, in which the nanoparticles and microparticles are selected from a group consisting of the following: alumina, silica, calcium carbonate, calcium sulfate, barium sulfate, barium oxalate, strontium sulfate, barium or strontium titanate, titanium oxide, tin oxide, lead oxide, iron oxide, iron phosphate, nickel, cobalt, silver, and gold particles.

4. A method of claim 2, in which second other nanoparticles, that are electromagnetically active, are added to the liquid.

5. A method of claim 4, in which the other nanoparticles are selected from a group consisting of the following: cuprous iodide, Prussian blue, magnetite, iron phosphate, cobalt oxide, manganese oxide, tin oxide, zinc oxide, titanium oxide, barium titanate, and strontium titanate.

6. A method of claim 4, in which the other nanoparticles are covered with a thin layer of metal phosphate, sulfate, or silicate.

7. A method of claim 1, in which the graphitic material consists of carbon nanotubes or functionalized carbon nanotubes.

8. A method of claim 7, in which the carbon nanotubes include double walled carbon nanotubes or functionalized double walled carbon nanotubes.

9. A method of claim 1, in which the graphitic material includes graphite or graphene or a combination of carbon nanotubes and graphene.

10. A method of claim 1, in which the cellulosic material includes cellulose or biochemically, biologically, or chemically modified cellulose.

11. A method of claim 1, in which the kinetic energy is produced mechanically or hydrodynamically.

12. A method of claim 11, in which the hydrodynamic kinetic energy is in the form of high pressure liquid jets or ultrasonic vibration.

13. A method of claim 1, in which second other nanoparticles, that are electromagnetically active, are added to the liquid.

* * * * *

UNITED STATES PATENT AND TRADEMARK OFFICE
CERTIFICATE OF CORRECTION

| | | |
|---|---|---|
| PATENT NO. | : 9,613,758 B2 | |
| APPLICATION NO. | : 13/518781 | |
| DATED | : April 4, 2017 | |
| INVENTOR(S) | : Pasi Moilanen and Jorma A. Virtanen | |

It is certified that error appears in the above-identified patent and that said Letters Patent is hereby corrected as shown below:

In the Drawings

Delete Sheet 8 of 21 and Insert attached Sheet 8 of 21.
Delete Sheet 11 of 21 and Insert attached Sheet 11 of 21.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*